United States Patent
Wagner et al.

(10) Patent No.: US 10,723,019 B2
(45) Date of Patent: Jul. 28, 2020

(54) SYSTEMS AND METHODS FOR ACQUIRING AND MOVING OBJECTS HAVING COMPLEX OUTER SURFACES

(71) Applicant: Berkshire Grey, Inc., Lexington, MA (US)

(72) Inventors: Thomas Wagner, Concord, MA (US); Kevin Ahearn, Fort Mill, SC (US); John Richard Amend, Jr., Belmont, MA (US); Benjamin Cohen, Somerville, MA (US); Michael Dawson-Haggerty, Pittsburgh, PA (US); William Hartman Fort, Stratham, NH (US); Christopher Geyer, Arlington, MA (US); Jennifer Eileen King, Oakmont, PA (US); Thomas Koletschka, Cambridge, MA (US); Michael Cap Koval, Mountain View, CA (US); Kyle Maroney, North Attleboro, MA (US); Matthew T. Mason, Pittsburgh, PA (US); William Chu-Hyon McMahan, Cambridge, MA (US); Gene Temple Price, Cambridge, MA (US); Joseph Romano, San Jose, CA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey, Inc., Lexington, MA (US)

( * ) Notice: Subject to any disclaimer, the term of this patent is extended or adjusted under 35 U.S.C. 154(b) by 0 days.

(21) Appl. No.: 16/052,111

(22) Filed: Aug. 1, 2018

(65) Prior Publication Data
US 2019/0039240 A1    Feb. 7, 2019

Related U.S. Application Data

(60) Provisional application No. 62/540,355, filed on Aug. 2, 2017.

(51) Int. Cl.
*B25J 15/00*    (2006.01)
*B25J 9/16*     (2006.01)
(Continued)

(52) U.S. Cl.
CPC ............. *B25J 9/1612* (2013.01); *B25J 9/109* (2013.01); *B25J 9/126* (2013.01); *B25J 15/0028* (2013.01);
(Continued)

(58) Field of Classification Search
CPC . B25J 9/1612; B25J 9/109; B25J 9/126; B25J 9/02; B25J 9/1055; B25J 9/108;
(Continued)

(56) References Cited

U.S. PATENT DOCUMENTS

| | | |
|---|---|---|
| 2,853,333 A | 9/1958 | Littell |
| 3,005,652 A | 10/1961 | Helm |

(Continued)

FOREIGN PATENT DOCUMENTS

| | | |
|---|---|---|
| CA | 2928645 A1 | 4/2015 |
| DE | 3810989 A1 | 8/1989 |

(Continued)

OTHER PUBLICATIONS

International Search Report and Written Opinion issued by the International Searching Authority in related International Application No. PCT/US2018/044819 dated Oct. 29, 2018, 11 pages.
(Continued)

*Primary Examiner* — Dalena Tran
(74) *Attorney, Agent, or Firm* — Gesmer Updegrove LLP

(57) ABSTRACT

In accordance with an embodiment, the invention provides an end effector for use with a programmable motion device.

The end effector includes a pair of mutually opposing surfaces, at least one of the pair of mutually opposing surfaces being movable with respect to an end effector support structure for supporting the at least one of the pair of mutually opposing surfaces.

76 Claims, 29 Drawing Sheets

(51) Int. Cl.
    *B25J 15/06*         (2006.01)
    *B25J 9/10*          (2006.01)
    *B25J 9/12*          (2006.01)

(52) U.S. Cl.
    CPC ....... *B25J 15/0038* (2013.01); *B25J 15/0616* (2013.01)

(58) Field of Classification Search
    CPC .... B25J 17/02; B25J 17/0208; B25J 15/0616; B25J 15/0023; B25J 15/0004; B25J 13/088; Y10S 901/29; Y10S 901/40; F16C 19/184; F16C 19/364
    USPC ............... 700/245; 414/734; 294/86.41, 67.5
    See application file for complete search history.

(56) References Cited

U.S. PATENT DOCUMENTS

| | | |
|---|---|---|
| 3,195,941 A | 7/1965 | Morey |
| 3,637,249 A | 1/1972 | Kuhl et al. |
| 3,743,340 A | 7/1973 | Williamann |
| 4,073,375 A | 2/1978 | Hart et al. |
| 4,389,064 A | 6/1983 | Laverriere |
| 4,561,686 A | 12/1985 | Atchley |
| 4,578,013 A | 3/1986 | Barillec et al. |
| 4,653,793 A | 3/1987 | Guinot et al. |
| 4,677,778 A | 7/1987 | Sorimachi et al. |
| 5,024,575 A | 6/1991 | Anderson |
| 5,207,465 A | 5/1993 | Rich |
| 5,752,729 A | 5/1998 | Crozier et al. |
| 5,791,861 A | 8/1998 | Seelig |
| 5,865,487 A | 2/1999 | Gore et al. |
| 6,015,174 A * | 1/2000 | Raes .................... B25J 15/0253 294/119.1 |
| 6,244,640 B1 | 6/2001 | Le Bricquer et al. |
| 6,817,639 B2 | 11/2004 | Schmalz et al. |
| 6,846,029 B1 | 1/2005 | Ragner et al. |
| 6,994,387 B1 | 2/2006 | Ragner et al. |
| 7,004,524 B2 | 2/2006 | Marshall |
| 7,017,961 B1 | 3/2006 | Parnell et al. |
| 7,140,389 B2 | 11/2006 | Schnatterer et al. |
| 7,263,890 B2 | 9/2007 | Takahashi |
| 7,311,489 B2 | 12/2007 | Ekman |
| 7,313,464 B1 | 12/2007 | Perreault et al. |
| 7,474,939 B2 | 1/2009 | Oda et al. |
| 7,618,074 B2 | 11/2009 | Zimmer |
| 7,637,548 B2 | 12/2009 | Fukano et al. |
| 7,677,622 B2 | 3/2010 | Dunkmann et al. |
| 7,726,716 B2 | 6/2010 | Shuttleworth |
| 8,070,203 B2 | 12/2011 | Schaumberger |
| 8,096,598 B2 | 1/2012 | Perlman |
| 8,132,835 B2 | 3/2012 | Ban et al. |
| 8,146,971 B2 | 4/2012 | LaValley et al. |
| 8,267,386 B2 | 9/2012 | Schaaf et al. |
| 8,548,626 B2 | 10/2013 | Steltz et al. |
| 8,777,284 B2 | 7/2014 | Schaller et al. |
| 8,936,291 B2 * | 1/2015 | Yasuda .................... B25J 15/08 294/119.1 |
| 9,266,237 B2 | 2/2016 | Nomura |
| 9,283,680 B2 | 3/2016 | Yasuda et al. |
| 9,486,926 B2 | 11/2016 | Kawano |
| 9,492,923 B2 | 11/2016 | Wellman et al. |
| 9,604,363 B2 | 3/2017 | Ban |
| 9,623,570 B1 | 4/2017 | Krahn et al. |
| 9,656,813 B2 | 5/2017 | Dunkmann et al. |
| 9,687,982 B1 | 6/2017 | Jules et al. |
| 9,926,138 B1 | 3/2018 | Brazeau et al. |
| 9,981,379 B1 * | 5/2018 | Youmans ............... B25J 9/1612 |
| 9,999,977 B2 | 6/2018 | Wagner et al. |
| 10,007,827 B2 | 6/2018 | Wagner et al. |
| 10,011,020 B2 | 7/2018 | Wagner et al. |
| 10,058,896 B2 | 8/2018 | Hicham et al. |
| 10,086,519 B2 | 10/2018 | Wagner et al. |
| 10,118,300 B2 | 11/2018 | Wagner et al. |
| 10,137,566 B2 | 11/2018 | Bastian, II et al. |
| 10,315,315 B2 | 6/2019 | Wagner et al. |
| 10,335,956 B2 | 7/2019 | Wagner et al. |
| 10,399,236 B2 | 9/2019 | Wagner et al. |
| 2001/0045755 A1 | 11/2001 | Schick et al. |
| 2001/0056313 A1 | 12/2001 | Osborne, Jr. |
| 2003/0038491 A1 | 2/2003 | Schmalz et al. |
| 2003/0075051 A1 | 4/2003 | Watanabe et al. |
| 2003/0160470 A1 | 8/2003 | Marshall |
| 2003/0164620 A1 | 9/2003 | Schmalz et al. |
| 2004/0169386 A1 | 9/2004 | Shuttleworth |
| 2004/0232716 A1 | 11/2004 | Reed et al. |
| 2007/0163377 A1 | 7/2007 | Miyazawa |
| 2009/0143911 A1 * | 6/2009 | Gage ................. H01L 21/67196 700/248 |
| 2010/0040450 A1 | 2/2010 | Parnell |
| 2010/0078953 A1 | 4/2010 | Ban et al. |
| 2010/0101346 A1 | 4/2010 | Johnson et al. |
| 2010/0109360 A1 | 5/2010 | Meisho |
| 2010/0292841 A1 | 11/2010 | Wickham |
| 2013/0110280 A1 | 5/2013 | Folk |
| 2013/0129464 A1 | 5/2013 | Regan et al. |
| 2013/0166061 A1 | 6/2013 | Yamamoto |
| 2013/0245824 A1 | 9/2013 | Barajas et al. |
| 2013/0343640 A1 | 12/2013 | Buehler et al. |
| 2013/0345872 A1 * | 12/2013 | Brooks ................. B25J 9/0087 700/259 |
| 2014/0067127 A1 | 3/2014 | Gotou |
| 2014/0105719 A1 | 4/2014 | Mueller et al. |
| 2014/0154036 A1 | 6/2014 | Mattern et al. |
| 2014/0255129 A1 | 9/2014 | Kenner |
| 2014/0305847 A1 | 10/2014 | Kudrus |
| 2015/0057793 A1 | 2/2015 | Kawano |
| 2015/0081090 A1 | 3/2015 | Dong |
| 2015/0190925 A1 | 7/2015 | Hoffman et al. |
| 2015/0203340 A1 | 7/2015 | Jacobsen et al. |
| 2015/0298316 A1 | 10/2015 | Accou et al. |
| 2015/0306770 A1 | 10/2015 | Mittal et al. |
| 2015/0328779 A1 | 11/2015 | Bowman et al. |
| 2015/0346708 A1 | 12/2015 | Mattern et al. |
| 2015/0352717 A1 | 12/2015 | Mundt et al. |
| 2015/0375398 A1 | 12/2015 | Penn et al. |
| 2015/0375401 A1 | 12/2015 | Dunkmann et al. |
| 2016/0096694 A1 | 4/2016 | Baylor et al. |
| 2016/0101526 A1 | 4/2016 | Saito et al. |
| 2016/0167227 A1 | 6/2016 | Wellman et al. |
| 2016/0221187 A1 | 8/2016 | Bradski et al. |
| 2016/0243704 A1 | 8/2016 | Vakanski et al. |
| 2016/0271805 A1 | 9/2016 | Kuolt et al. |
| 2017/0021499 A1 | 1/2017 | Wellman et al. |
| 2017/0036354 A1 | 2/2017 | Chavan Dafle et al. |
| 2017/0043953 A1 | 2/2017 | Battles et al. |
| 2017/0050315 A1 | 2/2017 | Henry et al. |
| 2017/0057091 A1 | 3/2017 | Wagner et al. |
| 2017/0072572 A1 | 3/2017 | Wagner et al. |
| 2017/0080566 A1 | 3/2017 | Stubbs et al. |
| 2017/0080571 A1 | 3/2017 | Wagner et al. |
| 2017/0080579 A1 | 3/2017 | Wagner et al. |
| 2017/0087718 A1 | 3/2017 | Wagner et al. |
| 2017/0106532 A1 | 4/2017 | Wellman et al. |
| 2017/0120455 A1 | 5/2017 | Wagner et al. |
| 2017/0121113 A1 | 5/2017 | Wagner et al. |
| 2017/0136632 A1 | 5/2017 | Wagner et al. |
| 2017/0157648 A1 | 6/2017 | Wagner et al. |
| 2017/0157649 A1 | 6/2017 | Wagner et al. |
| 2017/0173638 A1 | 6/2017 | Wagner et al. |
| 2017/0197316 A1 | 7/2017 | Wagner et al. |

(56) References Cited

U.S. PATENT DOCUMENTS

| | | |
|---|---|---|
| 2017/0225330 A1 | 8/2017 | Wagner et al. |
| 2017/0305694 A1 | 10/2017 | McMurrough et al. |
| 2017/0322561 A1 | 11/2017 | Stiernagle |
| 2017/0369244 A1 | 12/2017 | Battles et al. |
| 2018/0056333 A1 | 3/2018 | Hicham et al. |
| 2018/0117773 A1 | 5/2018 | Odhner et al. |
| 2018/0127219 A1 | 5/2018 | Wagner et al. |
| 2018/0134501 A1 | 5/2018 | Ge et al. |
| 2018/0146618 A1 | 5/2018 | Elazary et al. |
| 2018/0148272 A1 | 5/2018 | Wagner et al. |
| 2018/0265291 A1 | 9/2018 | Wagner et al. |
| 2018/0265298 A1 | 9/2018 | Wagner et al. |
| 2018/0265311 A1 | 9/2018 | Wagner et al. |
| 2018/0273295 A1 | 9/2018 | Wagner et al. |
| 2018/0273296 A1 | 9/2018 | Wagner et al. |
| 2018/0273297 A1 | 9/2018 | Wagner et al. |
| 2018/0273298 A1 | 9/2018 | Wagner et al. |
| 2018/0281202 A1 | 10/2018 | Brudniok et al. |
| 2018/0282065 A1 | 10/2018 | Wagner et al. |
| 2018/0282066 A1 | 10/2018 | Wagner et al. |
| 2018/0312336 A1 | 11/2018 | Wagner et al. |
| 2018/0327198 A1 | 11/2018 | Wagner et al. |
| 2018/0330134 A1 | 11/2018 | Wagner et al. |
| 2018/0333749 A1 | 11/2018 | Wagner et al. |
| 2019/0001505 A1 | 1/2019 | Wagner et al. |
| 2019/0022702 A1 | 1/2019 | Vegh et al. |
| 2019/0329979 A1 | 10/2019 | Wicks et al. |

FOREIGN PATENT DOCUMENTS

| | | |
|---|---|---|
| DE | 10121344 A1 | 11/2002 |
| DE | 102005018207 A1 | 10/2006 |
| DE | 102007028680 A1 | 12/2008 |
| DE | 102007054867 A1 | 5/2009 |
| DE | 102010002317 A1 | 8/2011 |
| DE | 102012003160 A1 | 9/2012 |
| DE | 102012009011 A1 | 12/2012 |
| DE | 102011115951 A1 | 4/2013 |
| DE | 102016004087 A1 | 8/2017 |
| EP | 0235488 A1 | 9/1987 |
| EP | 1256421 B1 | 11/2002 |
| EP | 1671906 A1 | 6/2006 |
| EP | 2181814 A1 | 5/2010 |
| EP | 2708335 A1 | 3/2014 |
| EP | 2960024 A2 | 12/2015 |
| FR | 2592827 A1 | 7/1987 |
| JP | H0769470 A | 3/1995 |
| JP | 2007182286 A1 | 7/2007 |
| JP | 2010201536 A | 9/2010 |
| WO | 2014161549 A1 | 10/2014 |
| WO | 2015162390 A1 | 10/2015 |
| WO | 2016100235 A1 | 6/2016 |
| WO | 2017035466 A1 | 3/2017 |
| WO | 2017036812 A1 | 3/2017 |
| WO | 2017044632 A1 | 3/2017 |
| WO | 2017044747 A1 | 3/2017 |
| WO | 2017119982 A1 | 7/2017 |
| WO | 2018017616 A1 | 1/2018 |
| WO | 2018176033 A1 | 9/2018 |

OTHER PUBLICATIONS

International Preliminary Report on Patentability issued by the International Bureau of WIPO in related International Application No. PCT/US2018/044819 dated Feb. 4, 2020, 8 pages.

Liu et al., "Hand-Arm Coordination for a Tomato Harvesting Robot Based on Commercial Manipulator," Proceeding of the IEEE International Conference on Robotics and Biomimetics (ROBIO), Shenzhen, China, Dec. 2013, pp. 2715-2720.

Hebert et al., "A Robotic Gripper System for Limp Material Manipulation: Hardware and Software Development and Integration," Proceedings of the 1997 IEEE International Conference on Robotics and Automation, Albuquerque, New Mexico, Apr. 1997, 7 pages.

Vittor et al., "A Flexible Robotic Gripper for Automation of Assembly Tasks," Proceedings of the ASME Dynamic Systems and Control Division, vol. 2, 72-2, presented at the 2003 ASME International Mechanical Engineering Congress, Nov. 15-21, 2003, Washington, D.C., 7 pages.

Bohg, et al., "Data-Driven Grasp Synthesis—A Survey," Transactions on Robotics, arXiv:1309.2660v2 [cs.RO] Apr. 14, 2016, 21 pages.

Cipolla et al., "Visually Guided Grasping in Unstructured Environments," Journal of Robotics and Autonomous Systems, vol. 19, No. 3-4, Mar. 1, 1997, pp. 337-346.

Klingbeil et al., "Grasping with Application to an Autonomous Checkout Robot," Journal of Robotics and Automation (ICRA), 2011 IEEE, May 9, 2011, pp. 2837-2844.

Carlisle et al., "A Pivoting Gripper for Feeding Industrial Parts," IEEE 1994, pp. 1650-1755.

Communication Pursuant to Rules 161(1) and 162 EPC issued by the European Patent Office in related European Patent Application No. 18762186.7 dated Mar. 10, 2020, 3 pages.

* cited by examiner

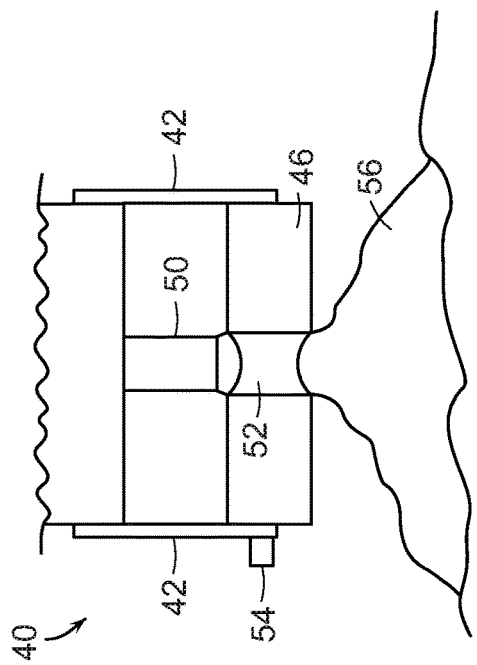
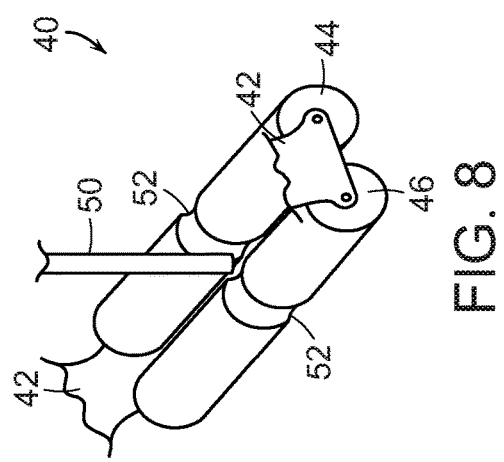
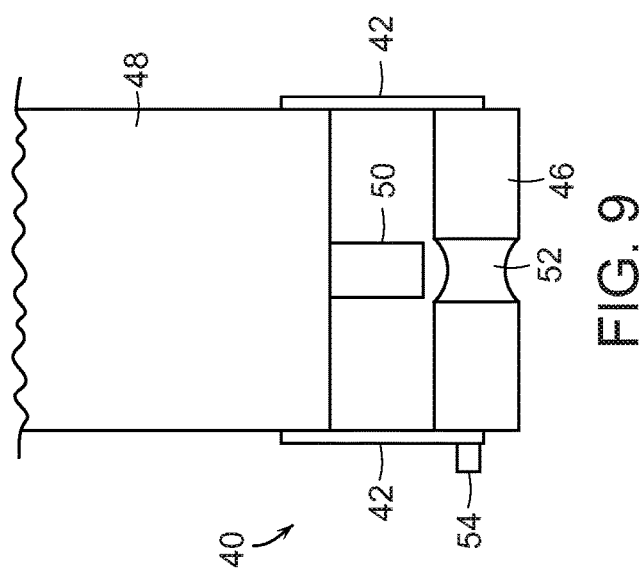

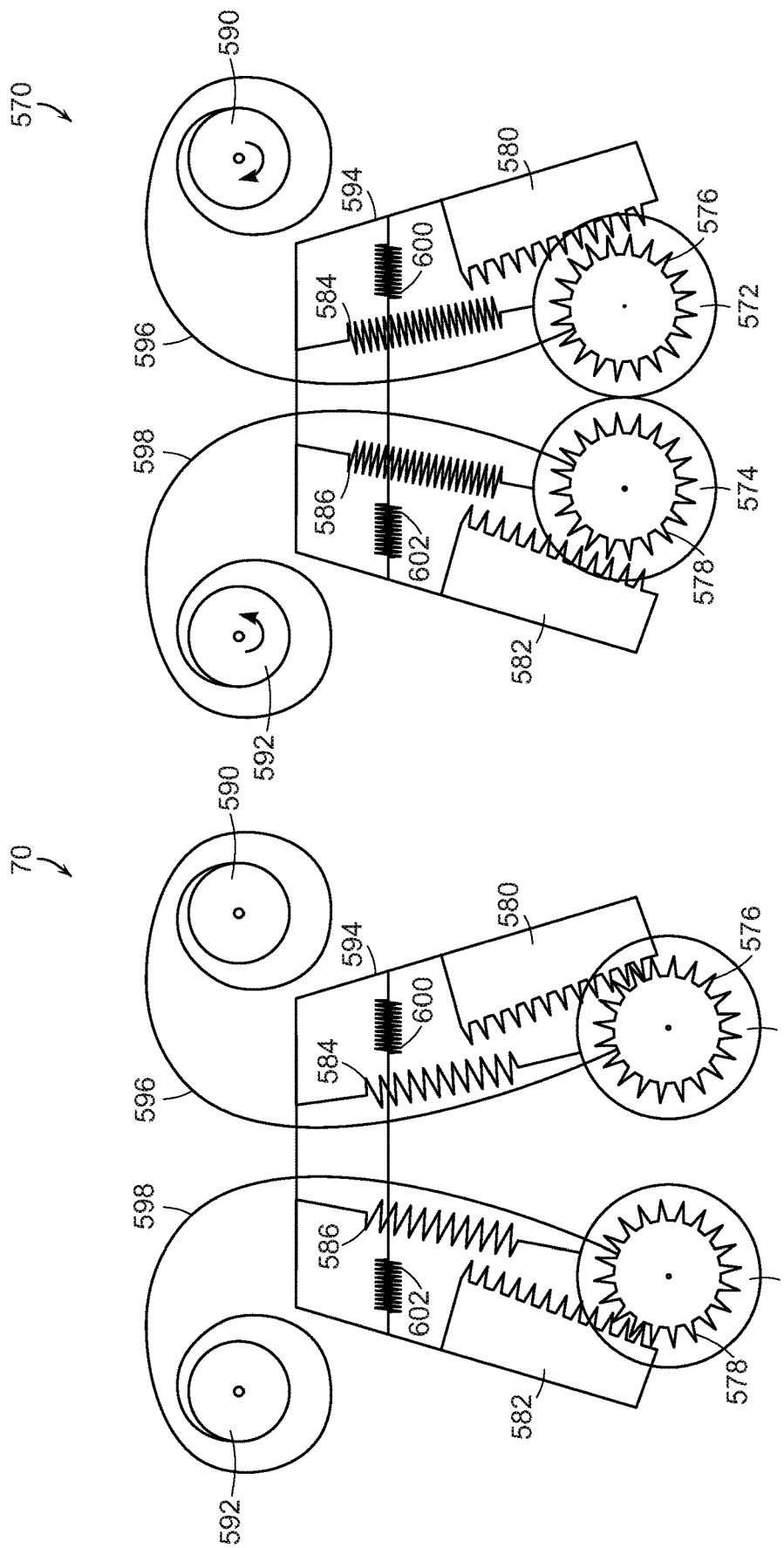

SYSTEMS AND METHODS FOR ACQUIRING AND MOVING OBJECTS HAVING COMPLEX OUTER SURFACES

PRIORITY

The present application claims priority to U.S. Provisional Patent Application Ser. No. 62/540,355 filed Aug. 2, 2017, the disclosure of which is hereby incorporated by reference in its entirety.

BACKGROUND

The invention generally relates to programmable motion systems and relates in particular to end effectors for programmable motion devices (e.g., robotic systems) for use in object processing such as object sortation or order fulfillment.

End effectors for robotic systems, for example, may be employed in certain applications to select and grasp an object, and then move the acquired object very quickly to a new location. End effectors that are designed to very securely grasp an object during movement may have limitations regarding how quickly and easily they may select and grasp an object from a jumble of dissimilar objects. Conversely, end effectors that may quickly and easily grasp a selected object from a jumble of objects (either similar or dissimilar objects) may have limitations regarding how securely they may grasp an acquired object during rapid movement, particularly rapid acceleration and deceleration (both angular and linear).

Many end effectors employ vacuum pressure for acquiring and securing objects for transport or subsequent operations by articulated arms. Other techniques for acquiring and securing objects employ electrostatic attraction, magnetic attraction, needles for penetrating objects such as fabrics, fingers that squeeze an object, hooks that engage and lift a protruding feature of an object, and collets that expand in an opening of an object, among other techniques. Typically, end effectors are designed as a single tool, such as for example, a gripper, a welder, or a paint spray head, and the tool is typically designed for a specific set of needs.

While many objects may include outer surfaces that are easily grasped by traditional end effectors, certain objects present difficulties for traditional end effectors. In shipping distribution systems, for example, many objects to be processed are provided as bags, e.g., polyethylene bags, that contain the item to be shipped. The bags present an outer surface that is soft and flexible, and that moves during a grasp attempt, which presents unique challenges to grasp planning systems.

There remains a need therefore, for an end effector in a programmable motion system that may select and grasp an object, and then move the acquired object very quickly to a new location, and further a need for an end effector that may consistently and reliably grasp objects that include unpredictable outer surfaces such as polyethylene bags.

SUMMARY

In accordance with an embodiment the invention provides an end effector for use with a programmable motion device. The end effector includes a pair of mutually opposing surfaces, at least one of the pair of mutually opposing surfaces being movable with respect to an end effector support structure for supporting the at least one of the pair of mutually opposing surfaces.

In accordance with another embodiment the invention provides an end effector for use with a programmable motion device. The end effector includes a pair of mutually opposing surfaces, at least one of the pair of mutually opposing surfaces being movable with respect to another of the pair of mutually opposing surfaces In accordance with a further embodiment the invention provides a method of grasping an object using an end effector of a programmable motion device. The method includes the steps of engaging the object with a pair of mutually opposing surfaces, and moving at least one of the pair of mutually opposing surfaces with respect to an end effector support structure for supporting the at least one of the pair of mutually opposing surfaces.

In accordance with yet a further embodiment the invention provides a method of grasping an object using an end effector of a programmable motion device. The method includes the steps of engaging the object with a pair of mutually opposing surfaces, and moving at least one of the pair of mutually opposing surfaces with respect to another of the pair of mutually opposing surfaces.

BRIEF DESCRIPTION OF THE DRAWINGS

The following description may be further understood with reference to the accompanying drawings in which:

FIG. 8 shows an illustrative diagrammatic view of an end effector in accordance with another embodiment of the present invention;

FIG. 9 shows an illustrative diagrammatic side view of the end effector of FIG. 8;

FIG. 10 shows an illustrative diagrammatic side view of the end effector of FIG. 8 beginning to engage an object;

FIGS. 56A and 56B show illustrative diagrammatic views of an end effector in accordance with another embodiment of the present invention that includes pinion gears and a dual tensioning mechanism in the open position (FIG. 56A) and in the closed position (FIG. 56B).

The drawings are shown for illustrative purposes only and are not necessarily to scale.

DETAILED DESCRIPTION

In accordance with various embodiments, systems of the invention may vary in shape, size, dimensions, weight, proportions, and design to accommodate different applications and/or to be tailored to various design constraints such as size, weight and fabrication materials.

In accordance with an embodiment, the invention provides an end effector for use with a programmable motion device. The end effector includes a pair of mutually opposing surfaces, at least one of the pair of mutually opposing surfaces being movable with respect to an end effector support structure for supporting the at least one of the pair of mutually opposing surfaces. In accordance with another embodiment, the at least one of the pair of mutually opposing surfaces is actuatable to roll with respect to the other of the mutually opposing surfaces. In a further embodiment, the at least one of the pair of mutually opposing surfaces is actuatable to move toward or away from the other of the pair of mutually opposing surfaces, and in further embodiments, the movement may be caused by linear movement or angular movement, and in further embodiments, the surfaces may be provided by a pair of rollers, a pair of spheres or a pair of belts.

Figure 1:
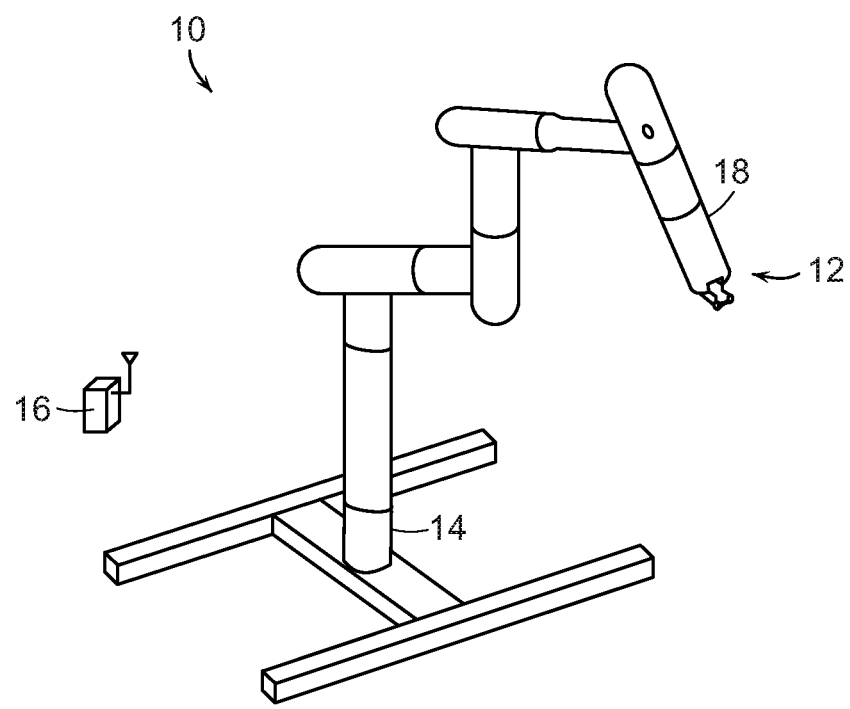
FIG. 1 shows an illustrative diagrammatic view of a programmable motion system with an end effector in accordance with an embodiment of the present invention.

FIG. 1, for example, shows a programmable motion device 10 (e.g., an articulated arm or a robotic system), that includes an end effector 12 attached to an end effector coupling unit 18, as well as a base 14 and a controller 16 that may be connected to the programmable motion device by wireless or wired communication. In certain embodiments for example, the controller 16 may be located within the base section 14. The programmable motion device may be employed for the processing of objects, such as for example, for sorting objects or for packaging objects into shipment packages. The programmable motion device may further be in communication with an order shipment fulfillment facility in which orders are parsed, items are collected, and items are prepared for shipment.

Figure 2:
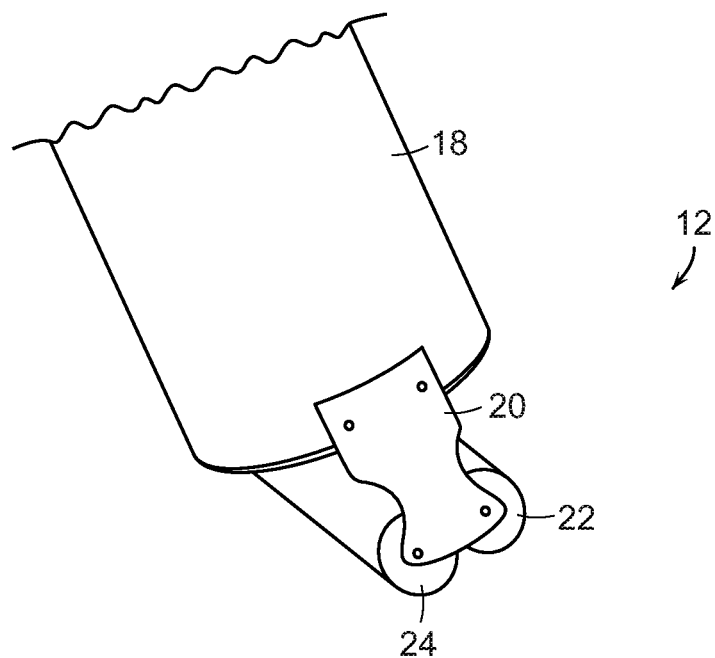
FIG. 2 shows an illustrative diagrammatic view of the end effector of FIG. 1.
Figure 3:
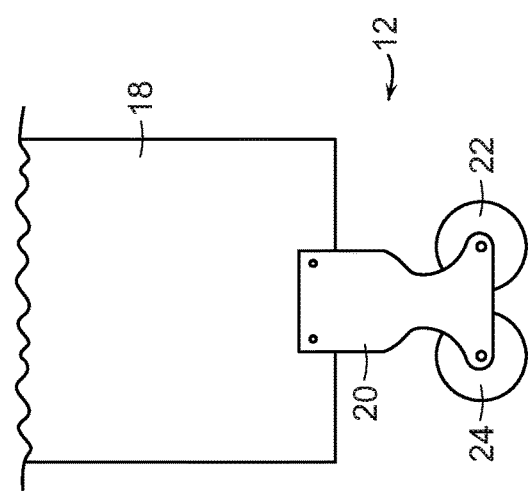
FIG. 3 shows an illustrative diagrammatic front view of end effector of FIG. 2.

The end effector 12 is further shown in FIG. 2, where the end effector 12 is shown attached to the section 18 by way of support structure 20 that attaches to the section 18 and supports a pair of rollers 22, 24. Each of the rollers 22, 24 is mounted on one of two axes, as shown in FIG. 3 (which shows a front view of the end effector 12 attached to the section 18), the rollers 22, 24 are adjacent one another, and are each powered by a motor. The rollers 22, 24 may be formed, for example, of polyurethane.

Figure 5:
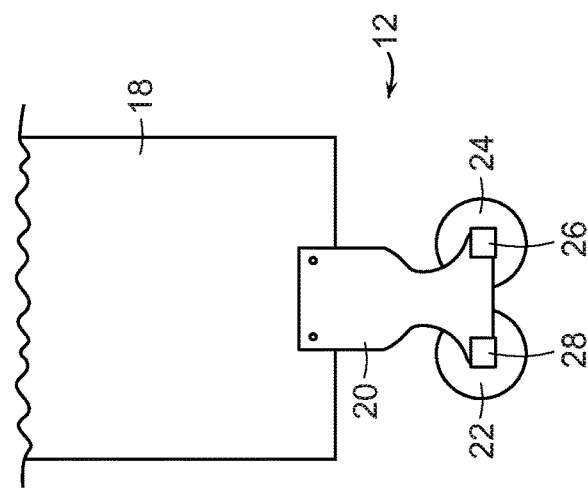
FIG. 5 shows an illustrative diagrammatic rear view of the end effector of FIG. 2.
Figure 4:
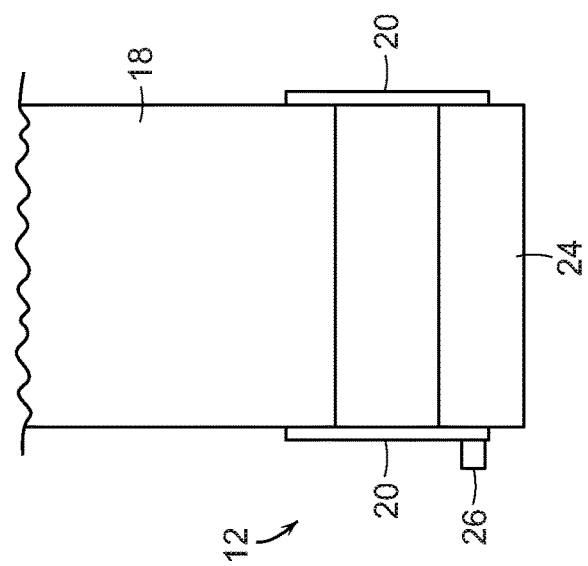
FIG. 4 shows an illustrative diagrammatic side view of the end effector of FIG. 2.

FIG. 4 shows a side view of the end effector of FIG. 3, also showing a motor 26 for actuating the roller 24 to roll in either direction. The roller actuation may be provided to each roller, and may be bi-directional. In particular, the roller 22 may be provided with a similar motor 28 for causing the roller 22 to be rotated in either direction as shown in FIG. 5. The motors 26, 28 may be controlled by either wireless or wired communication. In certain embodiments, the motors may be actuated together, or may be moved in dependent of each other. In further embodiments, one motor may be used to actuate only one of the rollers, or one motor may be used to actuate both motors through a gearing linkage.

Figure 7:
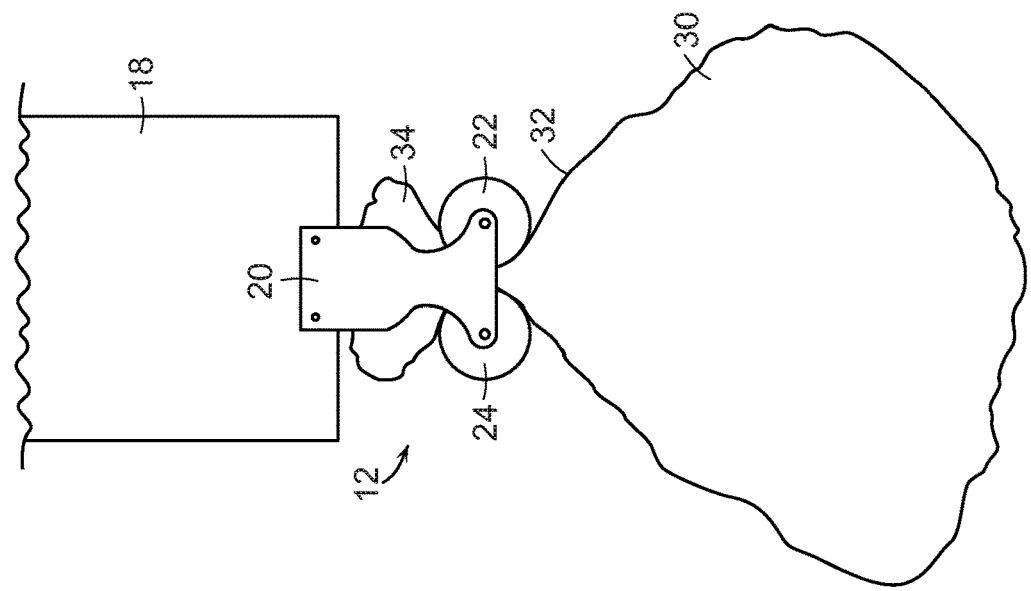
FIG. 7 shows an illustrative diagrammatic front view of the end effector of FIG. 6 engaging the object.
Figure 6:
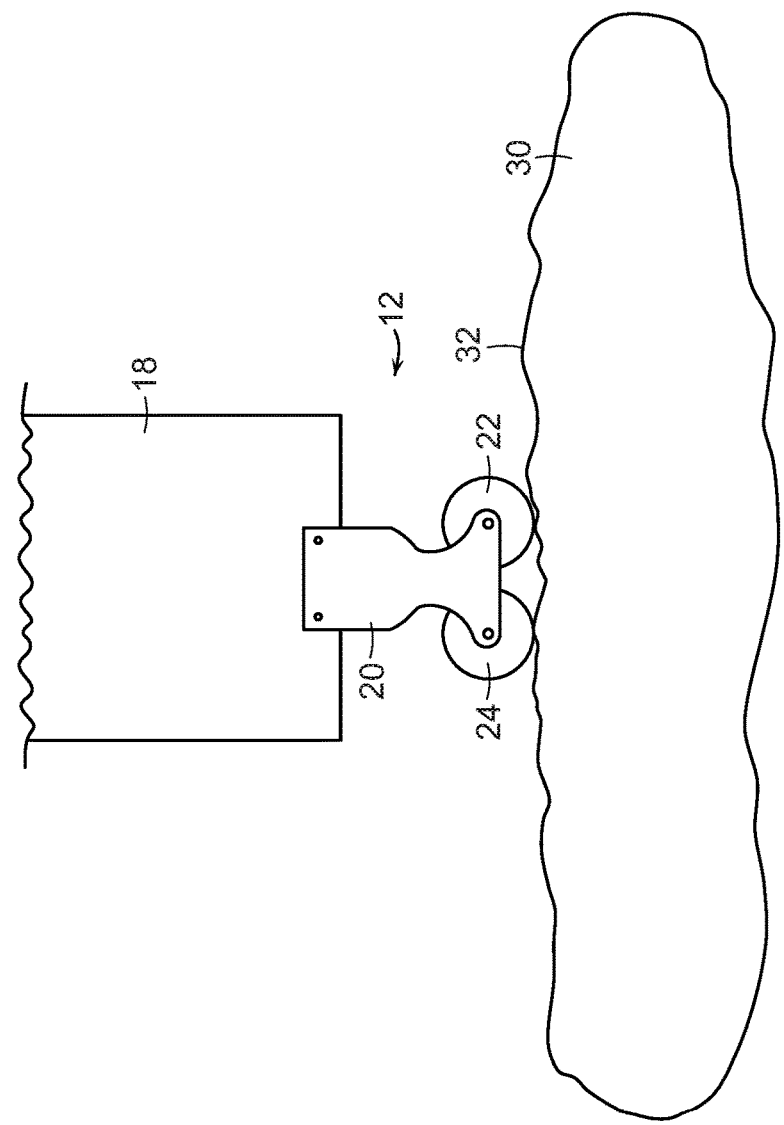
FIG. 6 shows an illustrative diagrammatic front view of the end effector of FIG. 2 contacting an object.

As shown in FIG. 6, the rollers 22, 24 of the end effector 12 may engage an object 30 (such as a polyethylene shipping bag) having an irregular and pliant surface 32. With reference to FIG. 7, when one or more of the rollers 22, 24 is/are actuated to roll as shown, a portion 34 of the bag is drawn up between the rollers. The object 30 may then be moved to a different location by the end effector, whereupon the one or more rollers 22, 24 may be rolled in the opposite direction to release the object 30.

Figure 11:
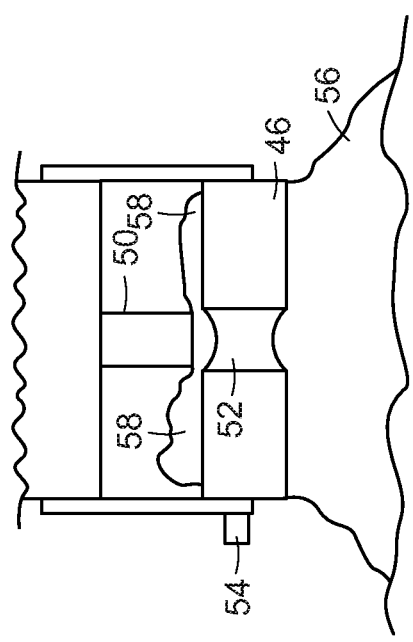
FIG. 11 shows an illustrative diagrammatic side view of the end effector of FIG. 10 fully engaging an object.

FIGS. 8 and 9 show an end effector 40 in accordance with another embodiment of the present invention that includes support structure 42 for attachment to a section 48 of a programmable motion device, as well as rollers 44 and 46 (again, for example made of polyurethane). The end effector 40 also includes a vacuum line 50 that provides vacuum to portions 52 of the rollers 44, 46 that include areas of reduced radii of the rollers 44, 46. In particular, the vacuum is provided between the rollers 44, 46 to facilitate the grasping of an object. FIGS. 10 and 11, for example, show the end effector 40 engaging an object 56 (shown in FIG. 10), and then actuating one or more motors 54 (similar to motors 22, 24) to grasp the object 56 by drawing a portion 58 of the outer surface of the object between the rollers 44, 46 (shown in FIG. 11).

Figure 13:
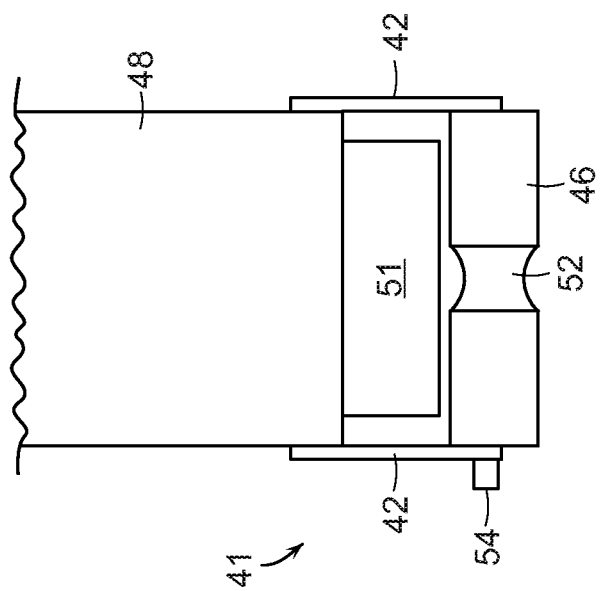
FIG. 13 shows an illustrative diagrammatic side view of the end effector of FIG. 12.
Figure 12:
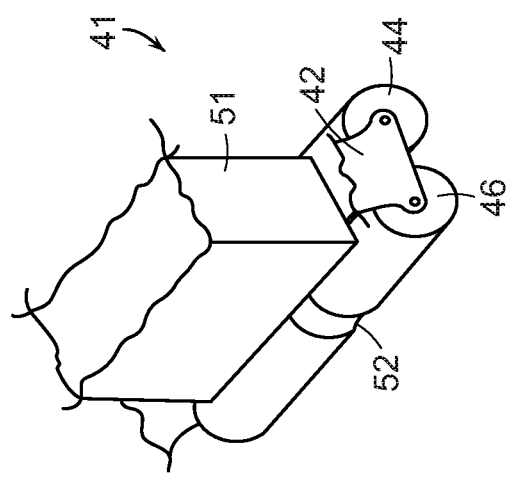
FIG. 12 shows an illustrative diagrammatic view of an end effector in accordance with another embodiment of the present invention.
Figure 14:
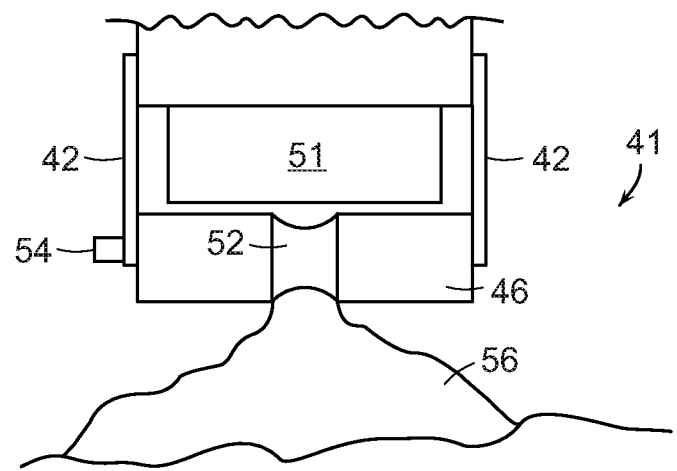
FIG. 14 shows an illustrative diagrammatic side view of the end effector of FIG. 10 beginning to engage an object.
Figure 15:
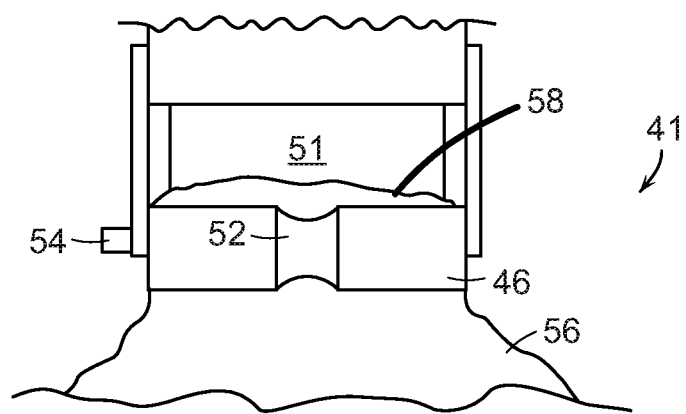
FIG. 15 shows an illustrative diagrammatic side view of the end effector of FIG. 10 fully engaging an object.

FIGS. 12 and 13 show an end effector 41 in accordance with a further embodiment of the present invention that includes support structure 42 for attachment to a section 48 of a programmable motion device, as well as rollers 44 and 46 (again, for example made of polyurethane). The end effector 41 also includes a vacuum line 51 that provide a wider area of vacuum to the rollers 44, 46, including areas of reduced radii of the rollers 44, 46. In particular, the vacuum is provided between the rollers 44, 46 to facilitate the grasping of an object. FIGS. 14 and 15 show the end effector 41 engaging an object 56 (shown in FIG. 14), and then actuating one or more motors 54 (similar to motors 22, 24) to grasp the object 56 by drawing a portion 58 of the outer surface of the object between the rollers 44, 46 (shown in FIG. 15).

Figure 16A:
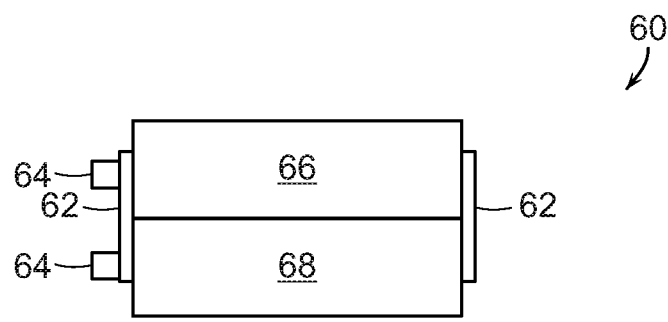
FIG. 16A-16C show illustrative diagrammatic bottom views of an end effector in accordance with further embodiments of the present invention where the rollers are variable spaced from one another.
Figure 16B:
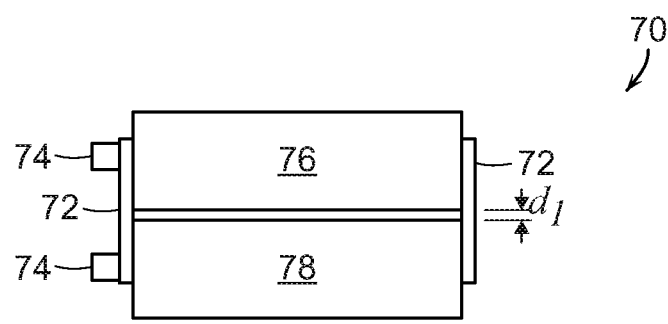
Figure 16C:
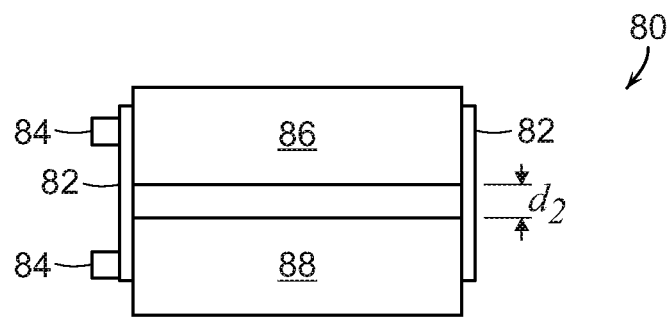

FIGS. 16A, 16B, and 16C show end effector portions in accordance with further embodiments of the invention that provide different distances between the rollers (again, for example made of polyurethane). For example, FIG. 16A shows an end effector 60 that includes support structure 62 as well as motors 64 for actuating rollers 66, 68. The rollers 66, 68 are provided with little or no space between the sides of the rollers. FIG. 16B shows an end effector 70 that includes support structure 72 as well as motors 74 for actuating rollers 76, 78. The rollers 76, 78 are provided with a small distance $d_1$ (e.g., 2 mm to 5 mm) between the sides of the rollers. FIG. 16C shows an end effector 80 that includes support structure 82 as well as motors 84 for actuating rollers 86, 88. The rollers 86, 88 are provided with a small distance $d_2$ (e.g., 0.65 cm to 2 cm) between the sides of the rollers.

Figure 17:
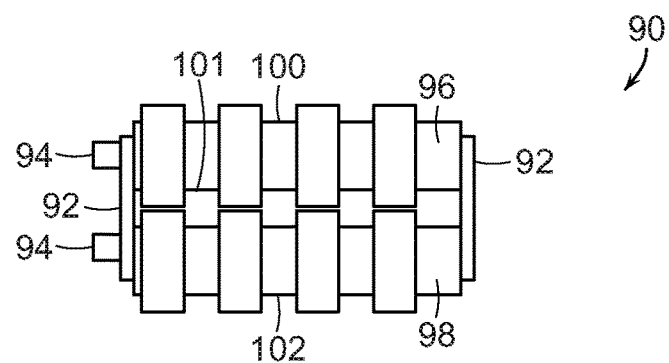
FIG. 17 shows an illustrative diagrammatic bottom view of an end effector in accordance with another embodiment of the invention including variable diameter rollers that provide variable sized openings.
Figure 18:
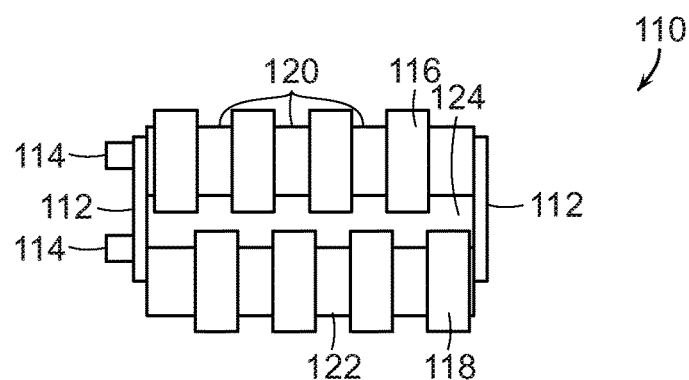
FIG. 18 shows an illustrative diagrammatic bottom view of an end effector in accordance with another embodiment of the invention including variable diameter rollers that are uniformly spaced from one another.
Figure 19:
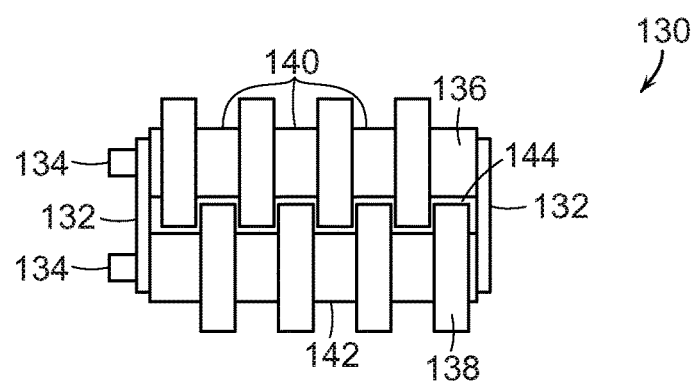
FIG. 19 shows an illustrative diagrammatic bottom view of an end effector in accordance with another embodiment of the invention including variable diameter rollers that are interleaved.

FIGS. 17-19 show embodiments of end effectors that include rollers having stepped bi-radius rollers (again, for example made of polyurethane). In particular, FIG. 17 shows an end effector 90 that includes support structure 92 as well as motors 94 for actuating rollers 96, 98. The rollers 96, 98 are provided with radially recessed sections 100, 102 for providing stepped bi-radius rollers wherein the recessed portions of the rollers align with one another. During use, either the area 101 between the recessed portions or the small area between the outer radius portions of the rollers may be used to engage an object such as a bag.

FIG. 18 shows an end effector 110 that includes support structure 112 as well as motors 114 for actuating rollers 116, 118. The rollers 116, 118 are provided with radially recessed sections 120, 122 for providing stepped bi-radius rollers wherein the recessed portions of the rollers do not align with one another. During use, the stepped area 124 between the rollers may be used to engage an object such as a bag.

FIG. 19 shows an end effector 130 that includes support structure 132 as well as motors 134 for actuating rollers 136, 138. The rollers 136, 138 are provided with radially recessed sections 140, 142 for providing stepped bi-radius rollers wherein the recessed portions of the rollers do not align with one another. During use, the stepped area 144 area between the rollers may be used to engage an object such as a bag. The stepped area 144 is smaller than that of the area 124 of FIG. 18 because the stepped regions of the rollers 136, 138 fit within one another as shown.

Figure 20:
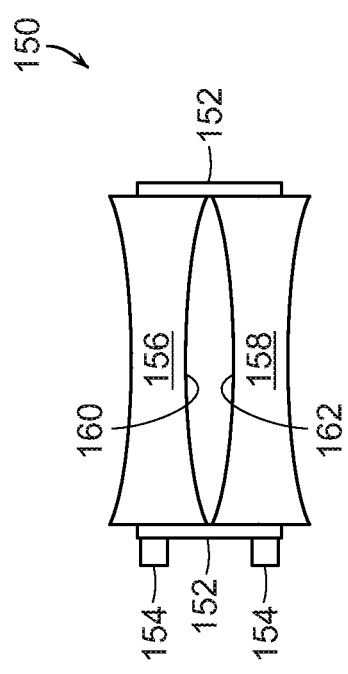
FIG. 20 shows an illustrative diagrammatic bottom view of an end effector in accordance with another embodiment of the invention including variable diameter rollers that provide a variable sized opening that is largest in the middle.

FIG. 20 shows an end effector 150 that includes support structure 152 as well as motors 154 for actuating rollers 156, 158 (again, for example made of polyurethane). The rollers 156, 158 are provided with radially recessed sections 160, 162 for providing a continuous area between the rollers that is largest at the center of the rollers as shown. During use, the area between the recessed portions 160, 162 may be used to engage an object such as a bag.

Figure 21:
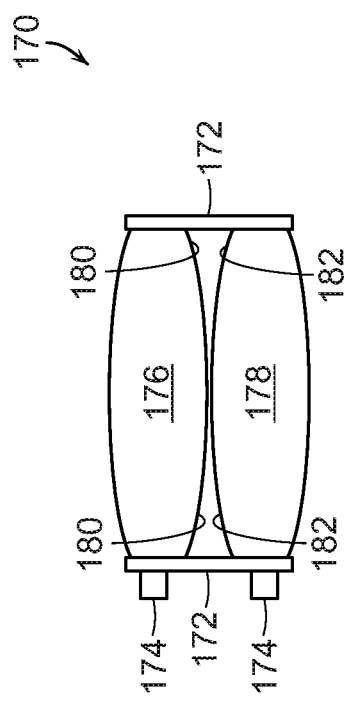
FIG. 21 shows an illustrative diagrammatic bottom view of an end effector in accordance with another embodiment of the invention including variable diameter rollers that provide a variable sized opening that is largest at the ends.

FIG. 21 shows an end effector 170 that includes support structure 172 as well as motors 174 for actuating rollers 176, 178 (again, for example made of polyurethane). The rollers 176, 178 are provided with radially recessed sections 180, 182 for providing a continuous area between the rollers that is smallest at the center of the rollers as shown. During use, the area between the recessed portions 180, 182 may be used to engage an object such as a bag. The embodiments of FIGS. 20 and 21 provide that portions of the rollers that have a variety of distances between the rollers, are provided to contact the object. The facilitates the grasping of objects wherein specific distances of a gap are better suited for engaging the outer surface of the object, due in part, to the thickness of the outer (bag) surface as well as the stiffness of the outer (bag) surface.

Figure 22A:
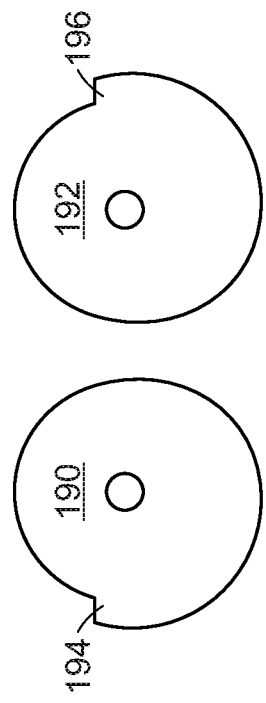
FIGS. 22A and 22B show illustrative diagrammatic front views of an end effector employing cam rollers in an open position (FIG. 22A) and a closed position (FIG. 22B)
Figure 22B:
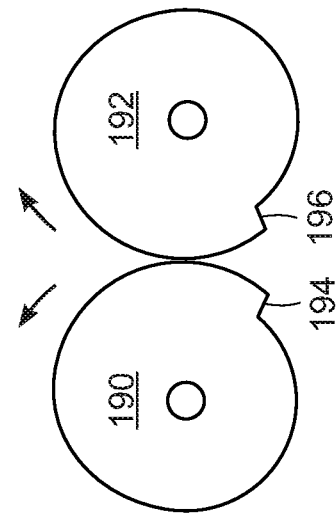

FIGS. 22A and 22B show end views of a pair of rollers 190, 192 (again, for example made of polyurethane) that each include a cam portion 194, 196 such that as each roller rotates, the cam portions 194, 196 are urged toward each other as shown in FIG. 22B. The use of the cam portions takes advantage of the fact that the rollers may need to be rotated only over a limited rotational range.

Figure 23A:
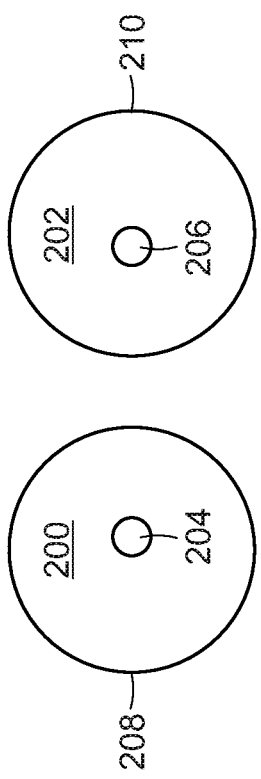
FIGS. 23A and 23B show illustrative diagrammatic front views of an end effector employing axially offset rollers in an open position (FIG. 23A) and a closed position (FIG. 23B)
Figure 23B:
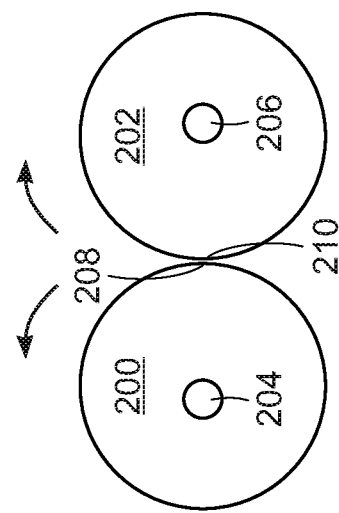

FIGS. 23A and 23B show end views of a pair of rollers 200, 202 (again, for example made of polyurethane) that are provided on axles 204, 206 that are not central to each roller. This provides that as each roller rotates, larger radius portions 208, 210 of the rollers 200, 202 are urged toward each other as shown in FIG. 23B. Again, the use of the larger radius portions also takes advantage of the fact that the rollers may need to be rotated only over a limited rotational range.

Figure 24A:
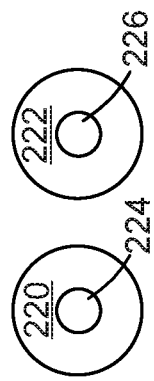
FIGS. 24A and 24B show illustrative diagrammatic front views of an end effector employing expandable rollers in an open position (FIG. 24A) and a closed position (FIG. 24B)
Figure 24B:
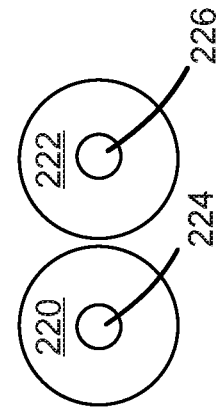

FIGS. 24A and 24B show end views of a pair of rollers 220, 222 (for example made of a flexible rubber material) that are provided on axles 224, 226 that are central to each roller. The rollers are formed of inflatable material, and may be inflated or deflated to change the radius (diameter of each of the rollers). This provides that as each roller rotates, its radius may be increased such that the rollers 220, 222 are urged toward each other as shown in FIG. 24B. The rollers 220, 222 may be inflated/deflated by actuation of valves that are coupled near the motors, and the rollers may be actuatable over a limited rotational range. The grasping and releasing of an object may be provided by any combination of rotation and inflation/deflation of the rollers.

Figure 25:
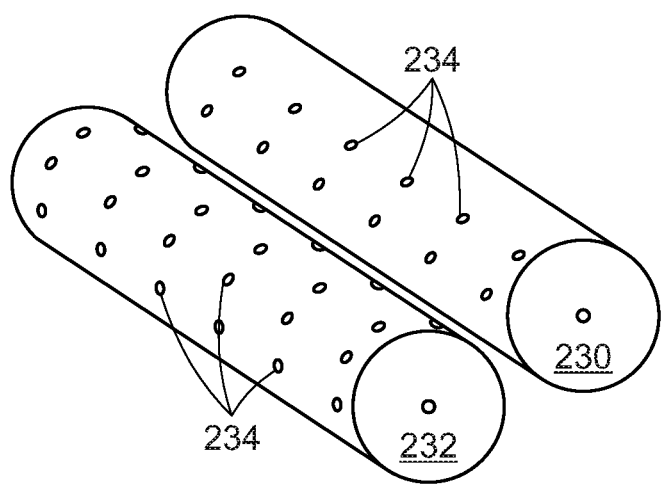
FIG. 25 shows an illustrative diagrammatic view of an end effector in accordance with an embodiment that includes rollers with attraction features.
Figure 26:
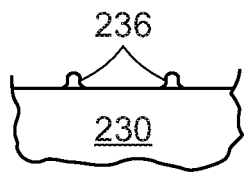
FIG. 26 shows an illustrative diagrammatic side elevation view of a roller of FIG. 25, where the attraction features include nubs.
Figure 28:
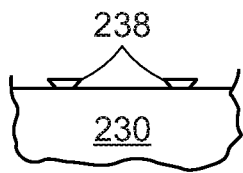
FIG. 28 shows an illustrative diagrammatic elevation view of a roller of FIG. 25, where the attraction features include suction cups.
Figure 30:
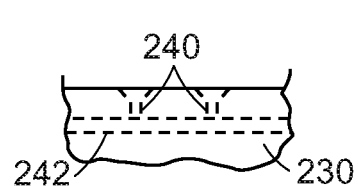
FIG. 30 shows an illustrative diagrammatic elevation view of a roller of FIG. 25, where the attraction features include vacuum ports.
Figure 27:
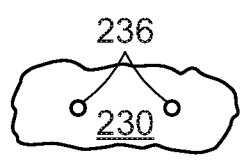
FIG. 27 shows an illustrative diagrammatic top view of the roller of FIG. 26.
Figure 29:
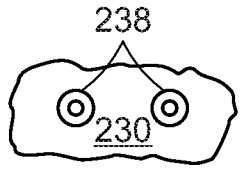
FIG. 29 shows an illustrative diagrammatic top view of the roller of FIG. 28.
Figure 31:
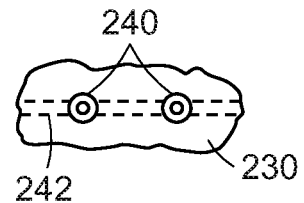
FIG. 31 shows an illustrative diagrammatic top view of the roller of FIG. 30.

FIG. 25 shows a pair of rollers 230, 232 (again, for example made of polyurethane) for use in an end effector of an embodiment that include grasp features 234 on the outer surface of the rollers 230, 232. With reference to FIGS. 26 and 27, the grasp features may be raised relief features 236 on the roller. With reference to FIGS. 28 and 29, the grasp features may be small cone shaped protrusions 238 that provide a mild suction feature. With reference to FIGS. 30 and 31, the grasp features may include openings 240 that lead to one or more conduits 242 in the material of the roller through which a vacuum may be provided to the openings 240. During use, the grasp features (e.g., 236, 238, 240) may facilitate the rollers in drawing a portion of a bag up between the rollers.

Figure 32:
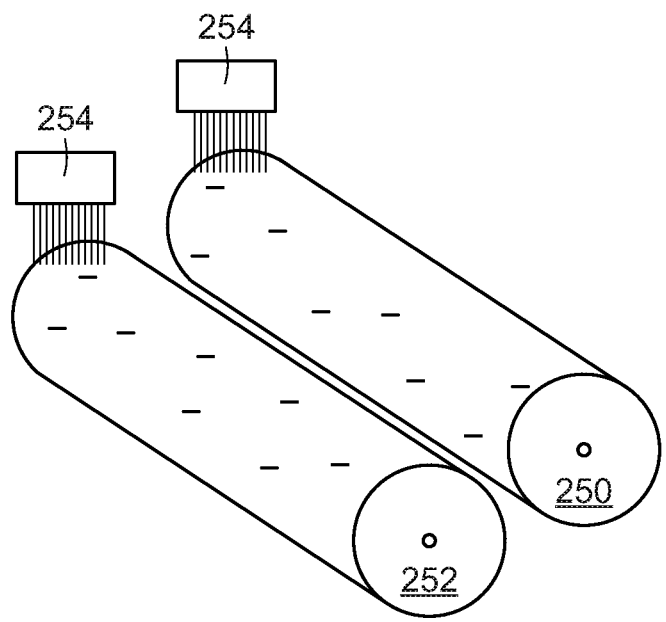
FIG. 32 shows an illustrative diagrammatic view of an end effector in accordance with another embodiment of the present invention that includes rollers with an applied static charge.
Figure 33:
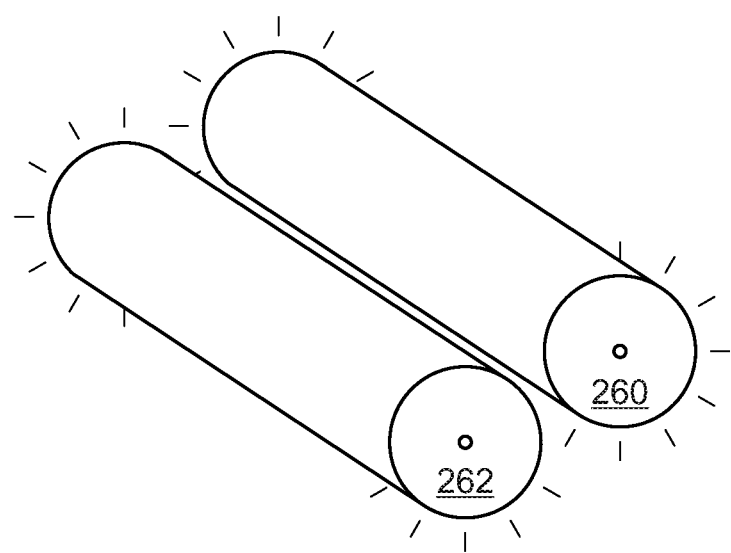
FIG. 33 shows an illustrative diagrammatic view of an end effector in accordance with another embodiment of the present invention that includes rollers with a material that is chemically attracted to polyurethane.

FIG. 32 shows a pair of rollers 250, 252 (again, for example made of polyurethane) for use in an end effector of an embodiment that are provided with a high electron charge that is maintained by electron charge distribution brushes 254. The high electron charge makes the rollers particularly attractive to certain types of bags such as polyurethane and polyethylene bags. Optionally, the brushes 254 may be provided to selectively distribute positive charge to the rollers in order to attract other types of objects to the rollers. In either event, the object may be released by either discharging (grounding) the rollers and/or mechanically urging the object from the rollers. FIG. 33 shows a pair of rollers 260, 262 for use in an end effector of an embodiment that include an outer surface made of a polyurethane-philic material such as a compatible plastic or by providing a coating of silicone or oxygen-based plasma.

Figure 34:
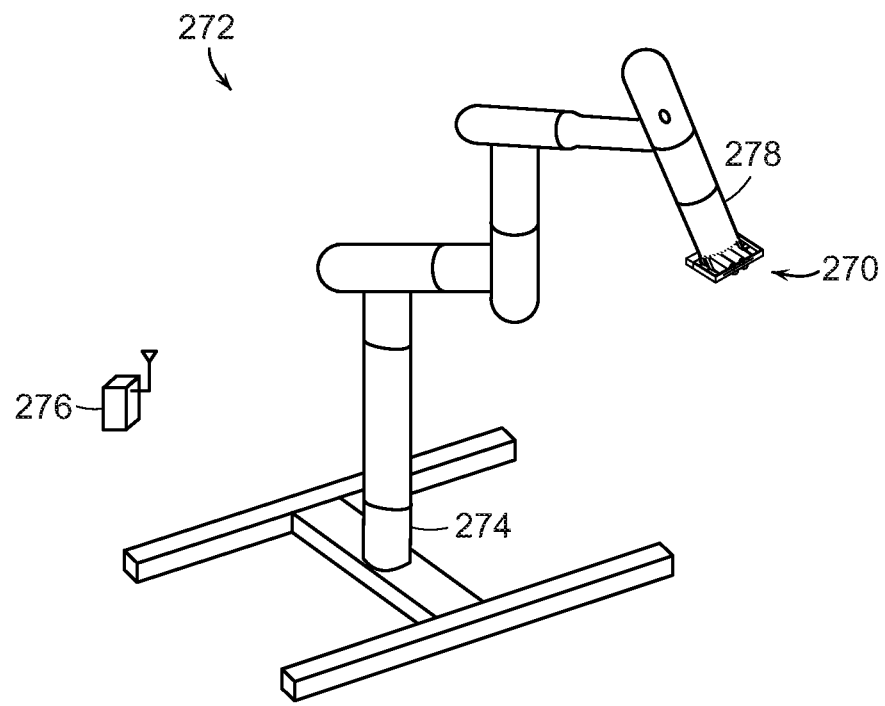
FIG. 34 shows an illustrative diagrammatic view of a programmable motion system with an end effector in accordance with another embodiment of the present invention that includes a set of rollers mounted in a frame.
Figure 35:
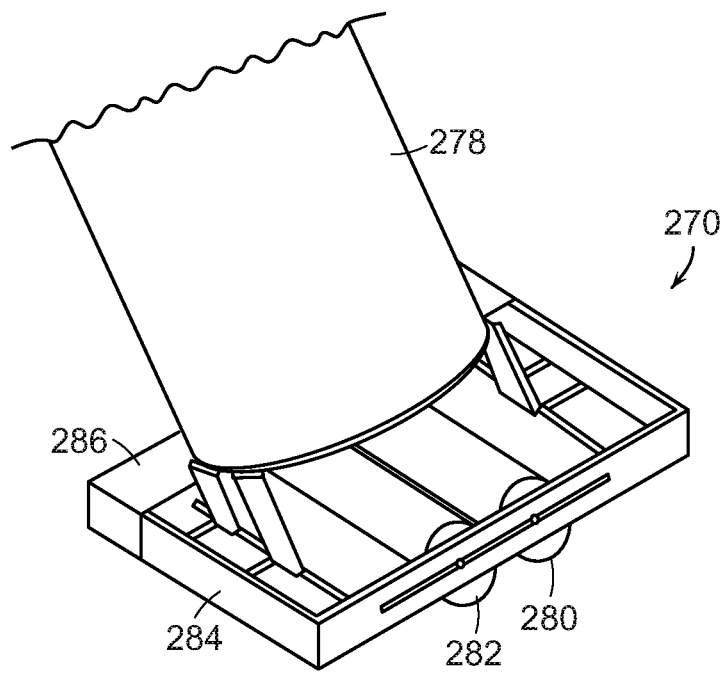
FIG. 35 shows an illustrative diagrammatic view of the end effector of FIG. 34.
Figure 36:
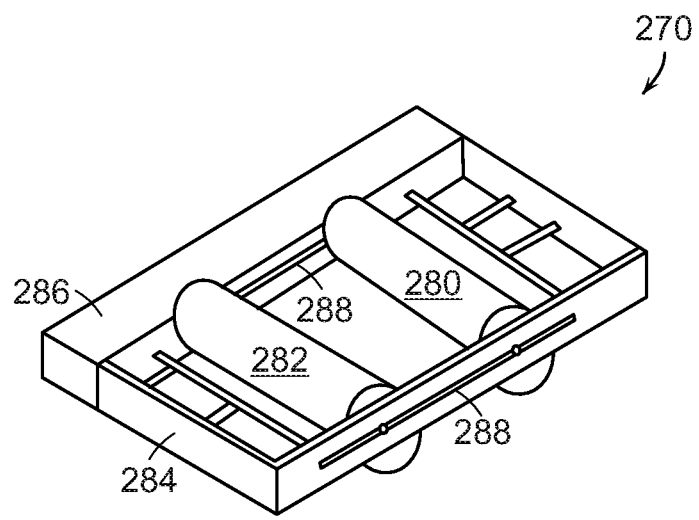
FIG. 36 shows an illustrative diagrammatic view of the end effector of FIG. 35 with the articulated arm removed for clarity.
Figure 37:
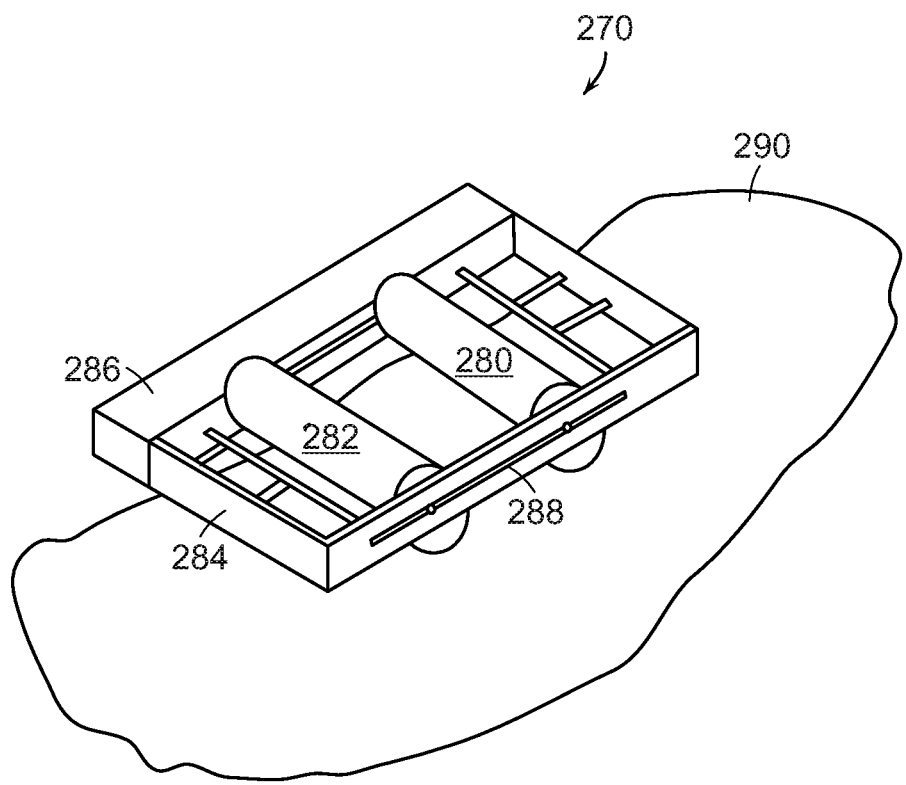
FIG. 37 shows an illustrative diagrammatic view of the end effector of FIG. 36 contacting an object.

In accordance with further embodiments, and with reference to FIG. 34, the invention provides an end effector 270 for use in connection with a programmable motion device 272 such as an articulated arm. The articulated arm may include a controller in its base 274, or may be coupled to a controller 276 via wireless communication. As further shown in FIG. 35, the end effector 270 may be attached to an outer section 278 of the articulated arm, and may include a set of rollers 280, 282 mounted in a frame 284. A control drive mechanism 286 is also provided to actuate one or both of the rollers. As further shown in FIG. 36, (without the mounting hardware for clarity), the rollers 280, 282 may be mounted on tracks 288 for automated movement toward or away from each other. FIG. 37 shows the end effector 270 coming into contact with a bag 290. As shown, the end effector 270 contacts the bag, which may move when contacted. The rollers may be formed, for example, of polyurethane.

Figure 38:
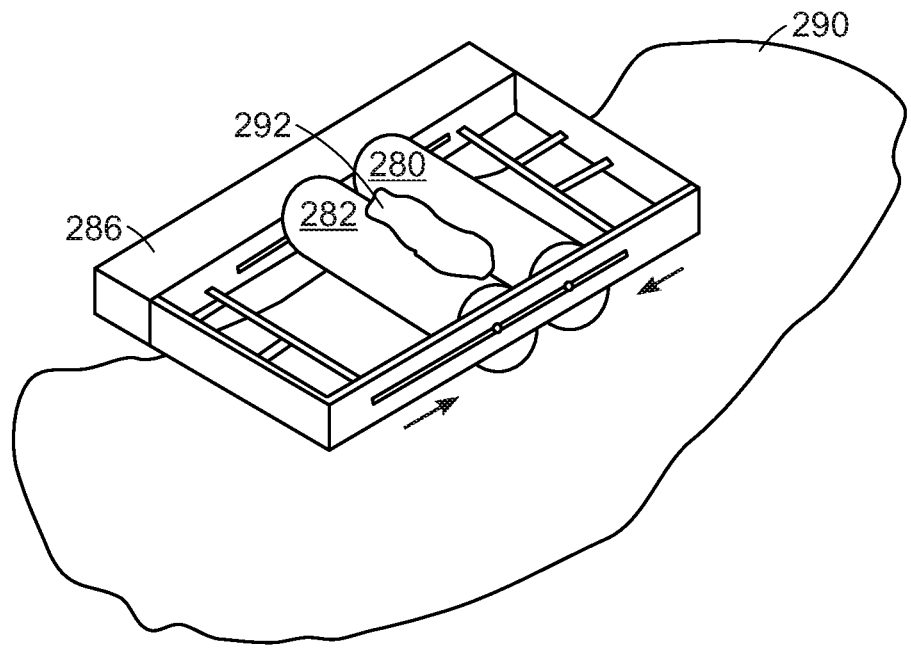
FIG. 38 shows an illustrative diagrammatic view of the end effector of FIG. 37 beginning to engage the object.
Figure 39:
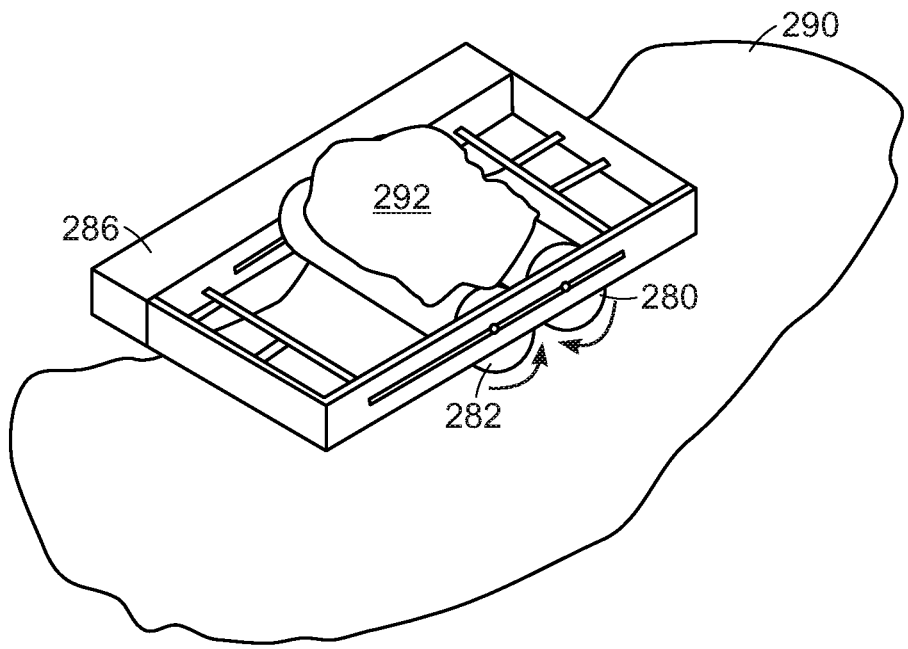
FIG. 39 shows an illustrative diagrammatic view of the end effector of FIG. 37 fully engaging the object.

As shown in FIG. 38, while the end effector 270 is in contact with the bag 290, the rollers 280, 282 may be moved toward each other, and when they are moved, a portion 292 of the bag may be gathered between the rollers. As shown in FIG. 39, one or both of the rollers is then rotated to grasp a larger portion 292 of the bag 290 between the rollers. The bag, as shown grasped in FIG. 39, is then ready for transport. The rollers may be rotated in the opposite direction and/or move away from each other to release the object (e.g., the bag).

Figure 40:
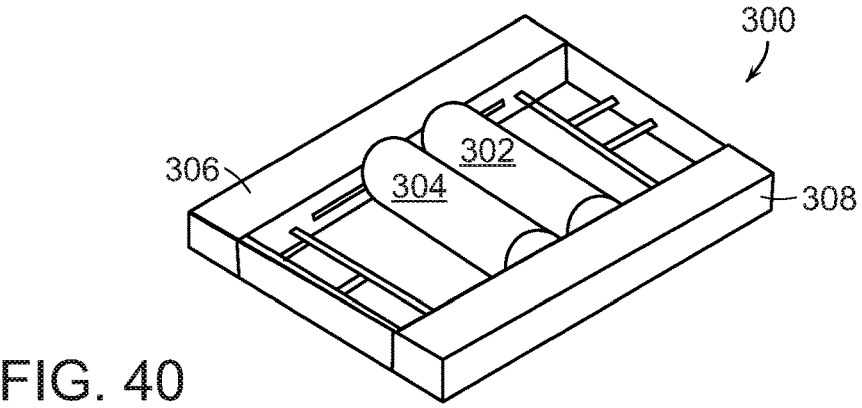
FIG. 40 shows an illustrative diagrammatic view of an end effector in accordance with another embodiment of the present invention where both rollers are linearly actuatable.

With reference to FIG. 40, an end effector 300 in accordance with a further embodiment may include a pair of rollers 302, 304 (again, for example made of polyurethane), as well as drive mechanisms 306, 308 (providing rotation and translation) on both ends of the rollers 302, 304. This may provide better power as well as control of roller position along the full length of the rollers 302, 304. The embodiment of FIGS. 34-39 therefore, may include a pair of drive mechanisms. In various embodiments disclosed herein, either or both of the rollers may be controllable with regard to angle, speed and/or torque.

Figure 41:
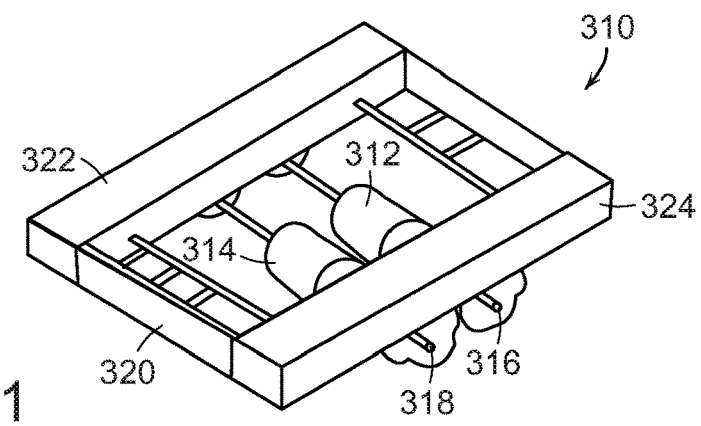
FIG. 41 shows an illustrative diagrammatic view of an end effector in accordance with another embodiment of the present invention where both rollers are offset from an underside of the support frame.
Figure 42:
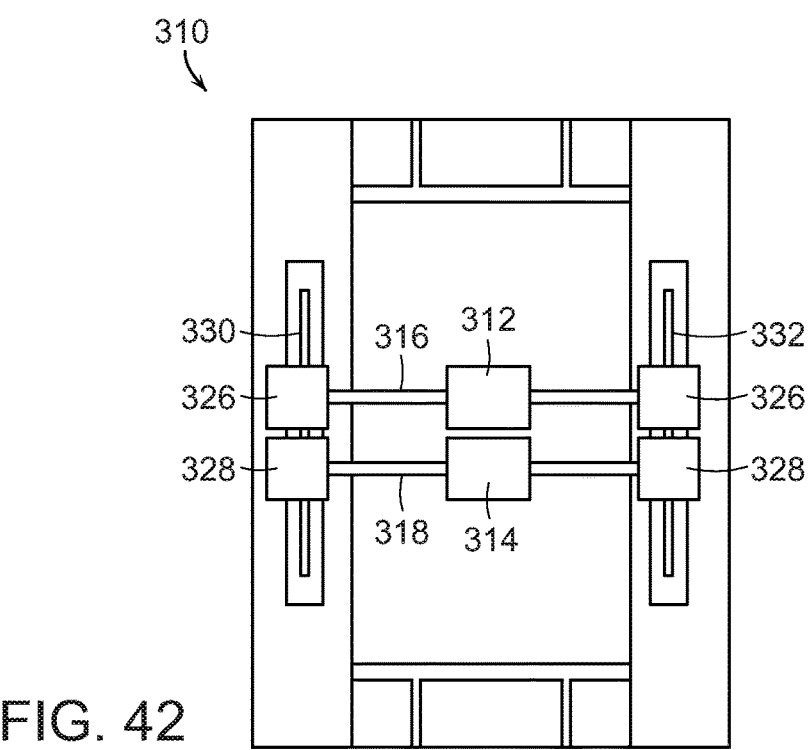
FIG. 42 shows an illustrative diagrammatic bottom view of the end effector of FIG. 41.

FIG. 41 shows an end effector 310 in accordance with a further embodiment of the present invention that includes a pair of rollers 312, 314 (again, for example made of polyurethane) that are mounted on shafts 316, 318 on the underside of the support frame 320, and are driven (translation and rotation) by motor controllers 322, 324. FIG. 42 shows an underside of the end effector 310. The shafts 316, 318 are attached to the underside of the frame 320 by way of movable mounts 326, 328 that are also able to be moved along tracks 330, 332 to provide the translational and rotation movement of the rollers 312, 314 as driven by drive mechanisms 326, 328. The embodiment of FIGS. 41 and 42 provides that the rollers 312, 314 may be disposed further away from the distal surface of the frame 320 to facilitate engagement with objects (e.g., bags). Additionally, the rollers 312, 314 may be smaller in size and not span the internal distance of the frame 320. The end effector 310 is operated as discussed above with reference to the embodiments shown in FIGS. 34-40.

Figure 43:
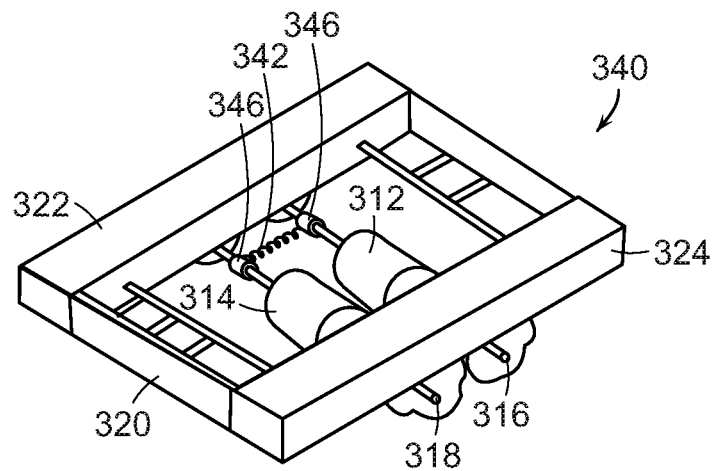
FIG. 43 shows an illustrative diagrammatic view of an end effector similar to that shown in FIG. 41 that includes spring biasing elements.
Figure 44:
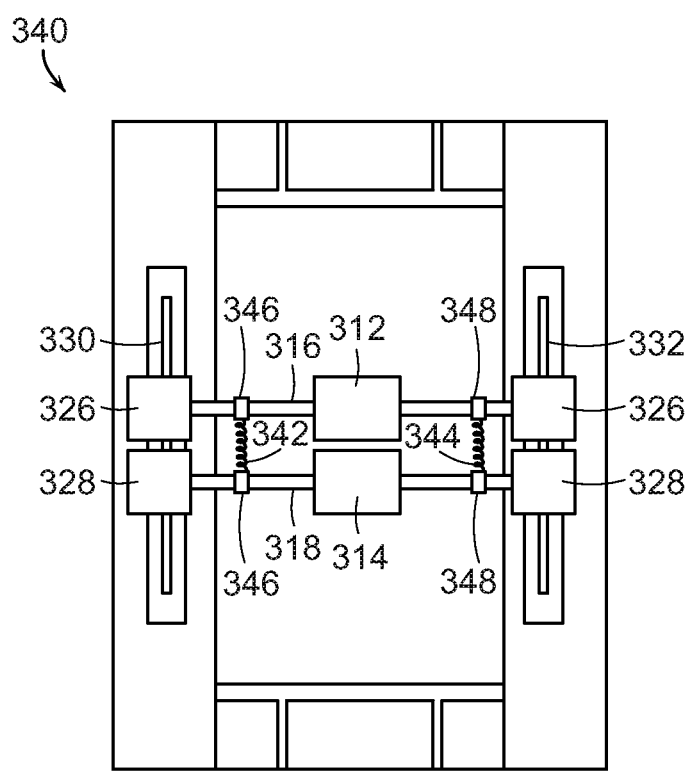
FIG. 44 shows an illustrative diagrammatic bottom view of the end effector of FIG. 43.

FIGS. 43 and 44 show an end effector 340 that is similar to the end effector 310 of FIGS. 41 and 42 except that the end effector 340 includes a roller axle biasing mechanism that includes, for example, two springs 342, 344, each fastened between a pair of collars 346, 348 around axles 316, 318 of the rollers 312, 314. The biasing mechanism urges the two rollers together, although the drive mechanisms 326, 328 may also be employed to draw the rollers apart from one another.

Figure 45A:
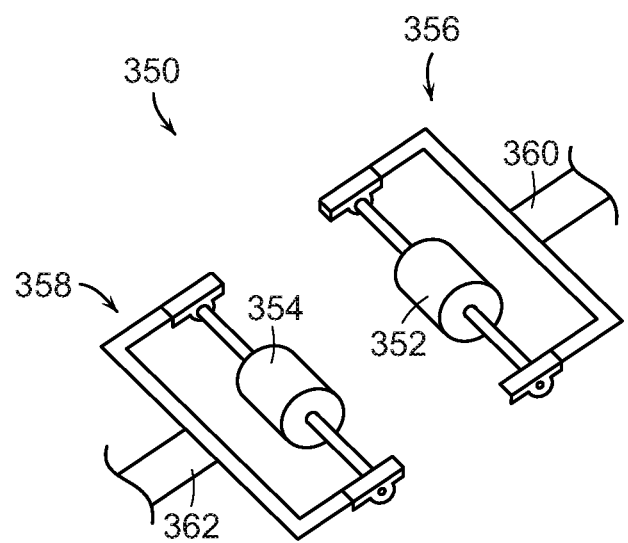
FIGS. 45A and 45B show illustrative diagrammatic views of an end effector in accordance with another embodiment of the present invention that includes rollers on independent frames in the open position (shown in FIG. 45A) and the closed position (FIG. 45B)
Figure 45B:
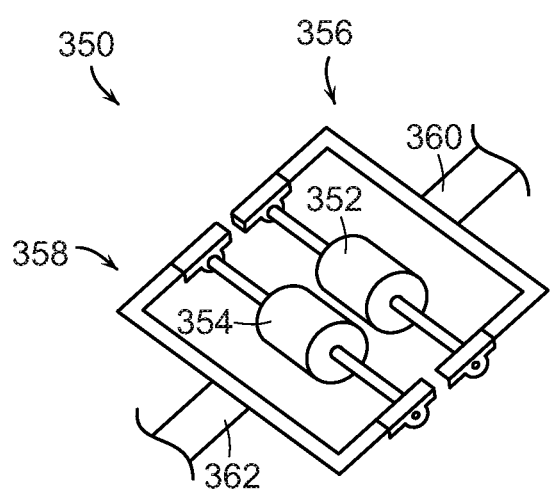

FIGS. 45A and 45B show an end effector 350 in accordance with a further embodiment of the present invention that includes a pair of rollers 352, 354 mounted on separate frames 356, 358, wherein each frame 356, 358 may be coupled to an arm 360, 362, and the arms 360, 362 may be attached to either a common (the same) programmable motion device, or may be attached to different programmable motion devices. During use, the programmable motion device(s) are employed to gather a portion of a bag between the rollers 352, 354 as discussed above.

Figure 46:
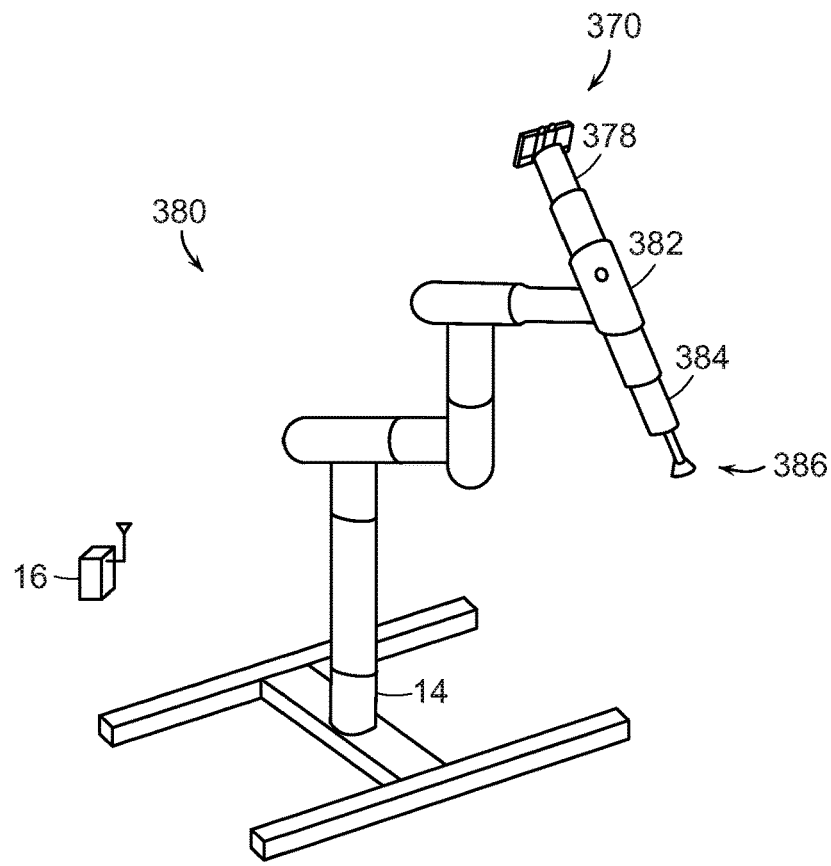
FIG. 46 shows an illustrative diagrammatic view of a programmable motion system with two opposing end effectors in accordance with another embodiment of the present invention.

FIG. 46 shows an embodiment of a system 380 in accordance with a further embodiment of the present invention that includes many features common to the embodiment shown in FIG. 34, except that the end effector 370 and associated outer section 378 are part of a larger end effector section 382 (of a programmable motion device 380) that also includes a second outer section 384 on which is attached at an opposing end thereof a second end effector 386 (e.g., a suction based end effector). During use, the programmable motion device 380 may elect to use either the end effector 370 or the end effector 386 depending on the object to be processed.

Figure 47:
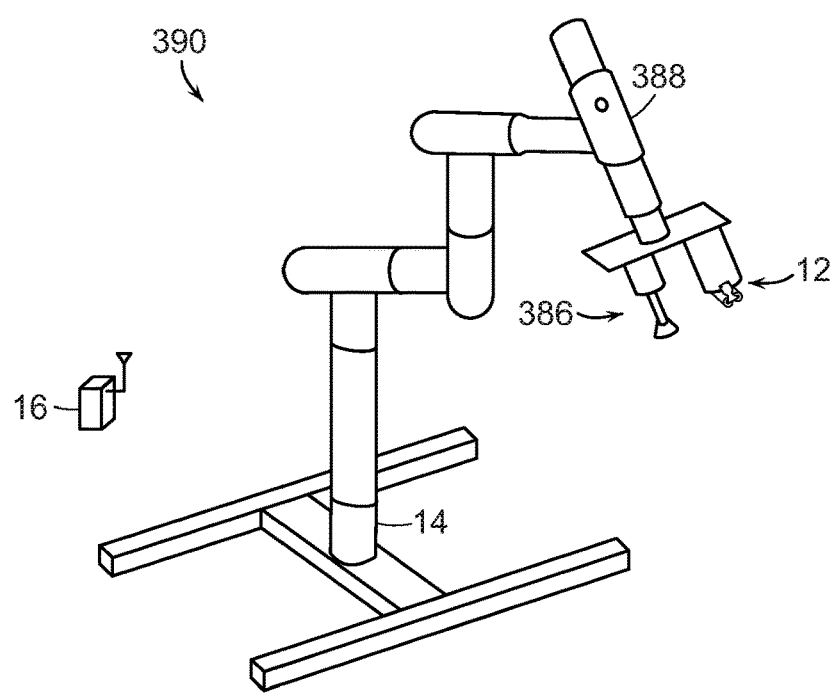
FIG. 47 shows an illustrative diagrammatic view of a programmable motion system with two adjacent end effectors in accordance with another embodiment of the present invention.

FIG. 47 shows an embodiment of a system 390 in accordance with a further embodiment of the present invention that includes a pair of end effectors 12 and 386 attached to a common end of a section 388. The end effector 12 may be as described above with respect to FIGS. 1-7, and the end effector 386 may be as describe above with respect to FIG. 46. Again, during use the programmable motion device 390 may elect to use either the end effector 12 or the end effector 386 depending on the object to be processed.

Figure 48A:
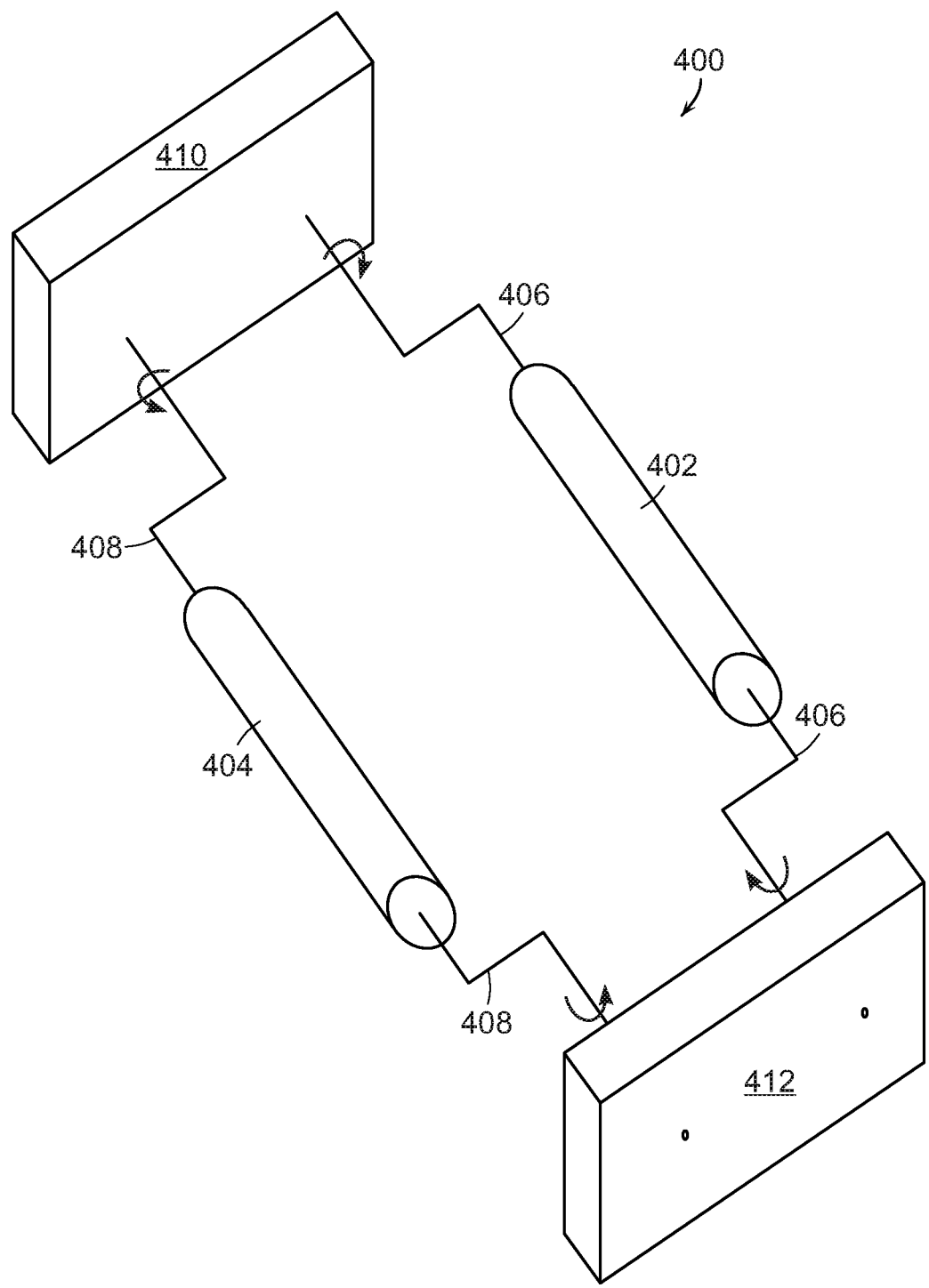
FIGS. 48A and 48B show illustrative diagrammatic views of an end effector in accordance with another embodiment of the present invention that includes rollers on multi-axis shafts in the open position (FIG. 48A) and in the closed position (FIG. 48B)
Figure 48B:
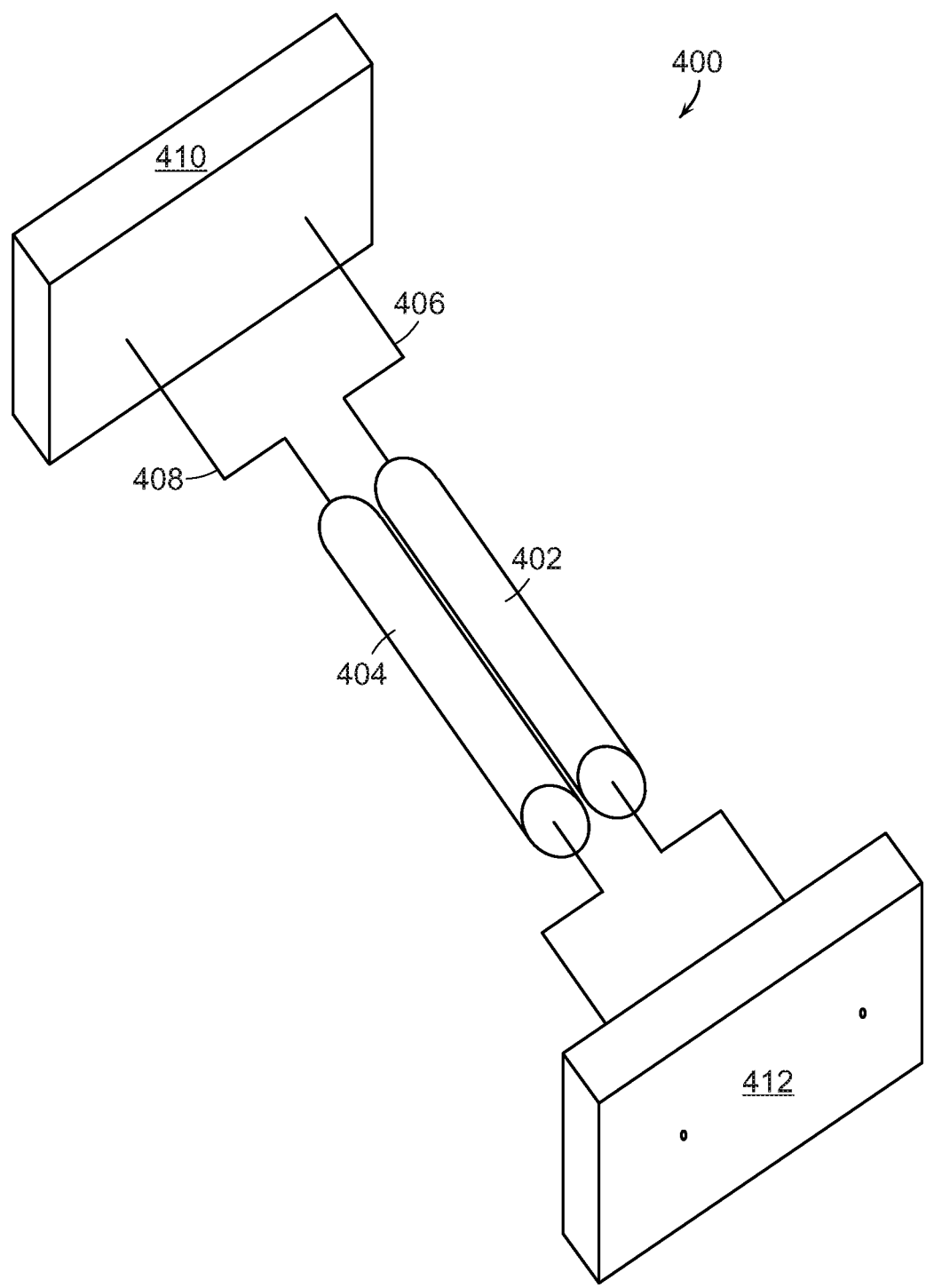

FIGS. 48A and 48B show an end effector 400 in accordance with a further embodiment of the present invention that includes a pair of rollers 402, 404 (again, for example made of polyurethane) that are fixed onto roller shafts 406, 408. As shown in FIG. 48B, when the roller shafts 406, 408 are rotated, the rollers 402, 404 are urged toward each other. In accordance with a preferred embodiment, the rollers 402, 404 are fixed to the shafts 406, 408 such that the rollers rotate with the shafts, causing any engaged object bag to become entrained with the rollers 402, 404. The rotational movement of the rollers 402, 404 may be provided by actuation mechanisms 410, 412.

Figure 49A:
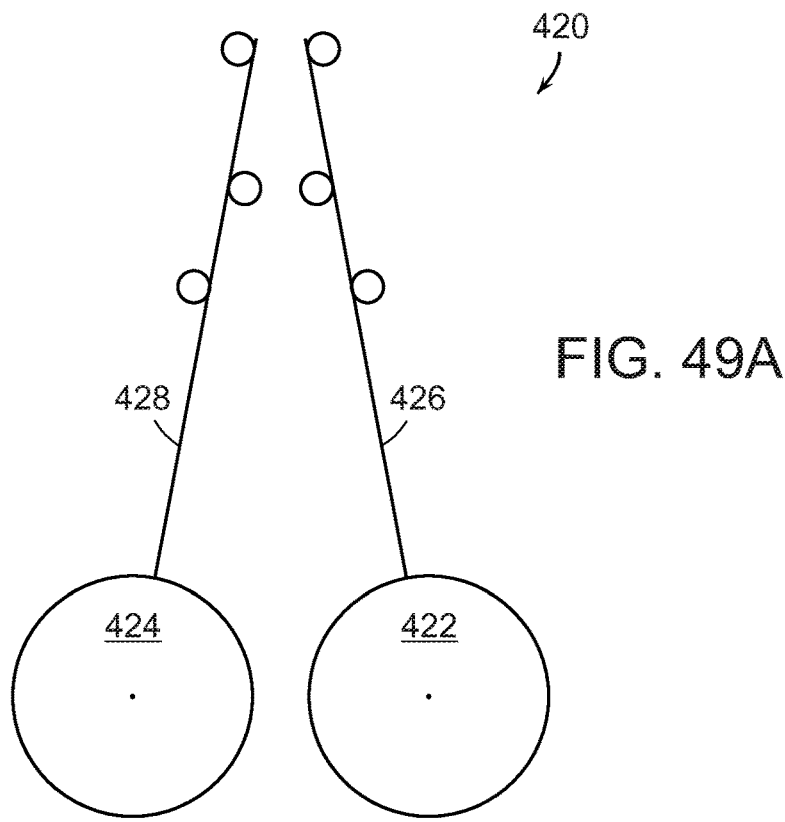
FIGS. 49A and 49B show illustrative diagrammatic views of an end effector in accordance with another embodiment of the present invention that includes rollers or spheres that are linearly movable toward and away from each other in the open position (FIG. 49A) and in the closed position (FIG. 49B)
Figure 49B:
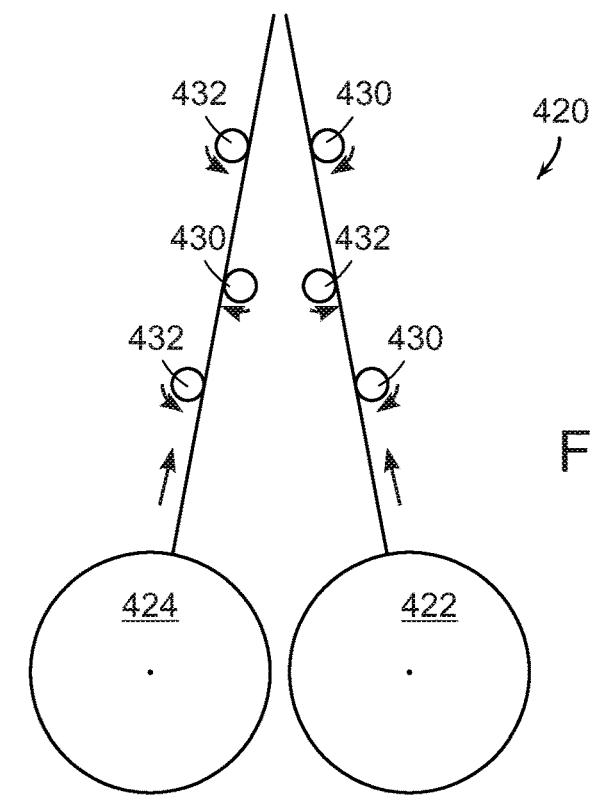

FIG. 49A shows portions of an end effector 420 in accordance with a further embodiment of the present invention that includes a pair of rollers or spheres 422, 424 (again, for example made of polyurethane) that are attached to rods (in the case of spheres) or plates 426, 428. Upon rotation of drivers 430 and 432, the rods or plates 426, 428 are caused to be linearly moved up or down. For example, when drivers 430 are rotated clockwise and drivers 432 are rotated counter-clockwise (as shown in FIG. 49B), the rods or plates 426, 428 together with the pair of spheres or rollers 422, 424 are linearly moved upward into contact with one another. When this happens the spheres or rollers 422, 424 may grasp an object such as a bag between the spheres or rollers 422, 424.

Figure 50A:
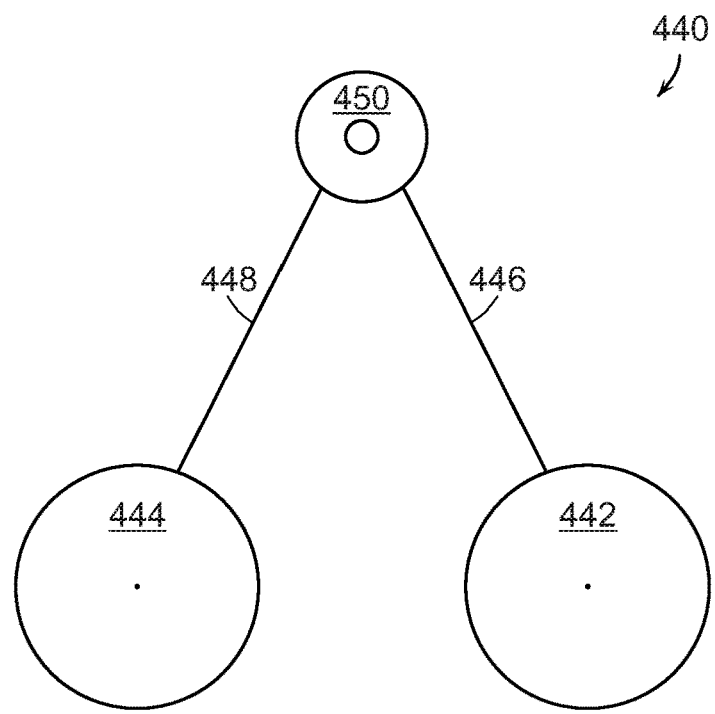
FIGS. 50A and 50B show illustrative diagrammatic views of an end effector in accordance with another embodiment of the present invention that includes rollers or spheres that are rotatably movable toward and away from each other in the open position (FIG. 50A) and in the closed position (FIG. 50B)
Figure 50B:
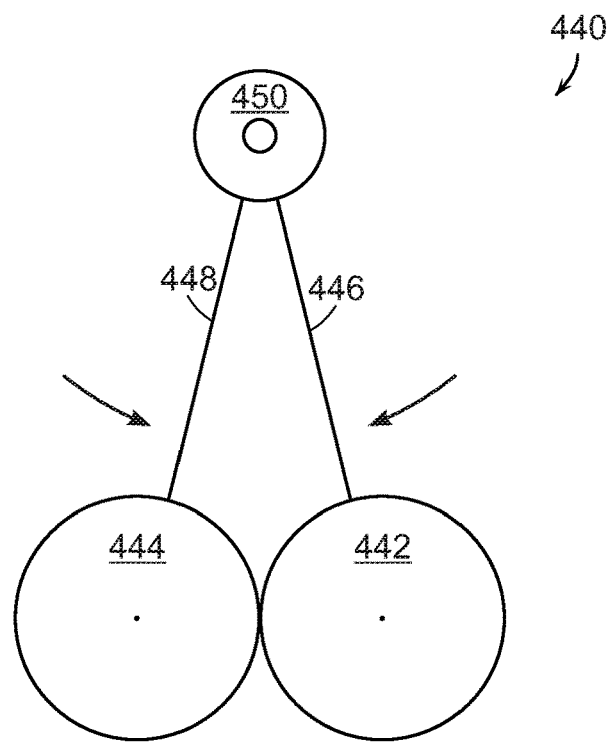

FIG. 50A shows portions of an end effector 440 in accordance with a further embodiment of the present invention that includes a pair of rollers or spheres 442, 444 (again, for example made of polyurethane) that are attached to rods (in the case of spheres) or plates 446, 448. Upon rotation of a rotational actuator 450, the rods or plates 446, 448 are drawn toward each other together with the spheres or rollers 442, 444, and when this happens, the spheres or rollers 442, 444 may grasp an object such as a bag between the spheres or rollers 442, 444 as shown in FIG. 50B.

Figure 51A:
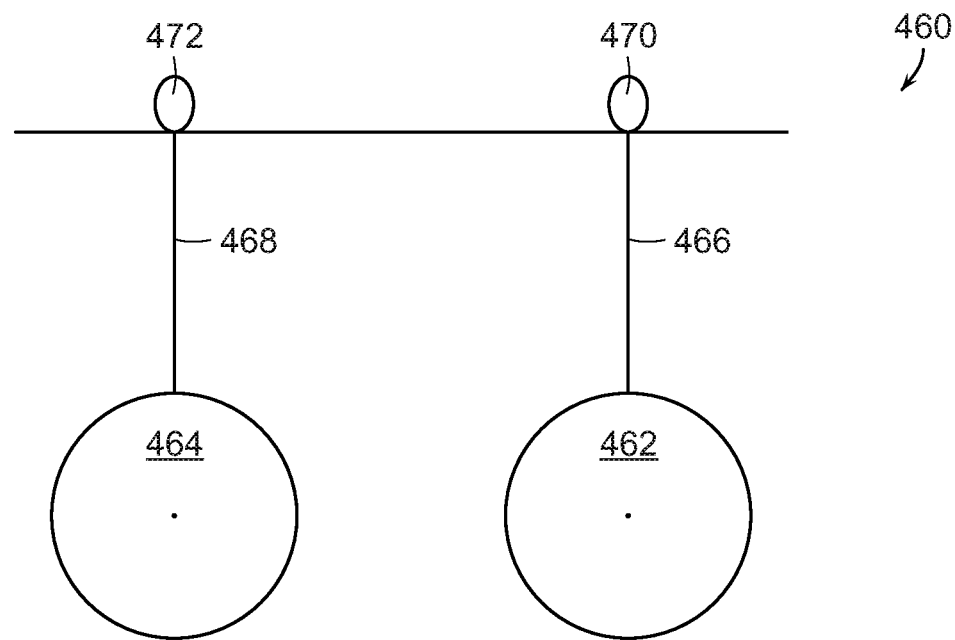
FIGS. 51A and 51B show illustrative diagrammatic views of an end effector in accordance with another embodiment of the present invention that includes rollers or spheres that are directly linearly movable toward and away from each other in the open position (FIG. 51A) and in the closed position (FIG. 51B)
Figure 51B:
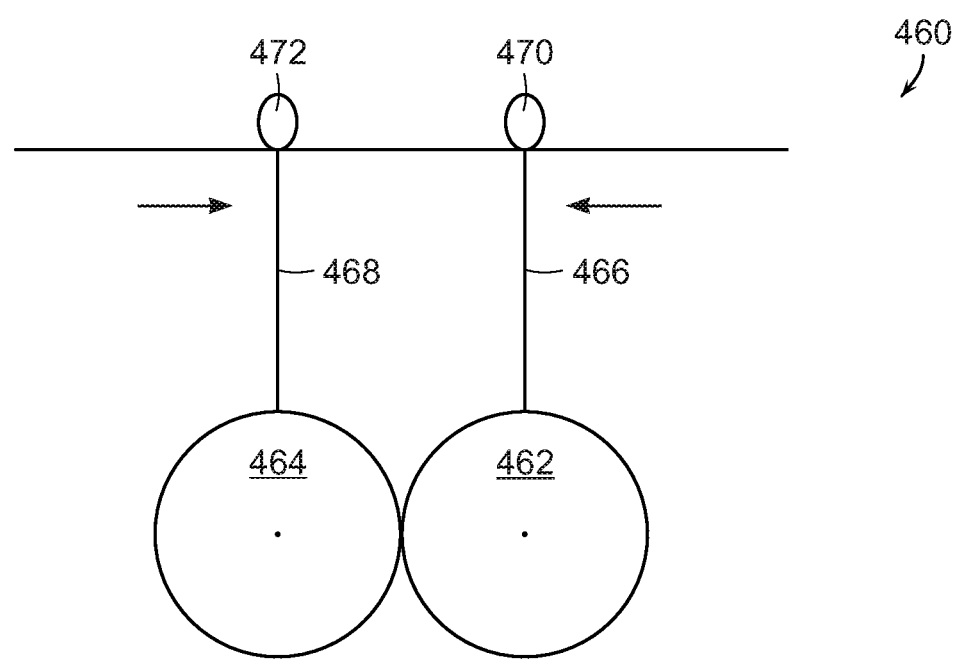

FIG. 51A shows portions of an end effector 460 in accordance with a further embodiment of the present invention that includes a pair of rollers or spheres 462, 464 (again, for example made of polyurethane) that are attached to rods (in the case of spheres) or plates 466, 468. Upon linear movement of actuators 470, 472, the rods or plates 466, 468 are drawn toward each other together with the spheres or rollers 462, 464, and when this happens, the spheres or rollers 462, 464 may grasp an object such as a bag between the spheres or rollers 462, 464 as shown in FIG. 51B.

Figure 52A:
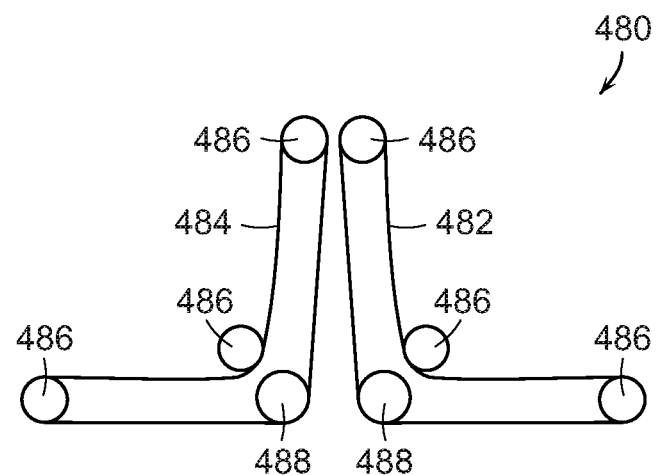
FIGS. 52A, 52B, and 52C show illustrative diagrammatic views of an end effector in accordance with another embodiment of the present invention that includes a pair of belts in the open position (FIG. 52A), and may include comb-like fingers that can spread apart, e.g., for grasping an object (FIG. 52B and FIG. 52C)
Figure 52B:
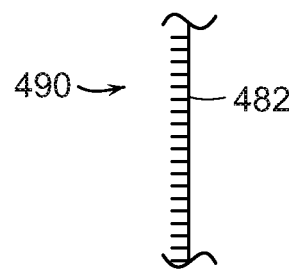
Figure 52C:
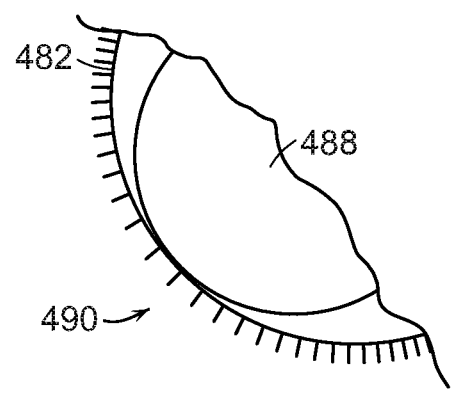

FIG. 52A shows a portion of an end effector 480 in accordance with another embodiment of the invention that includes a pair of belts 482, 484 for providing a pair of mutually opposing surfaces. The belts 482, 484 are provided around drive and follower units 486, 488, and objects may be grasped an drawn up between the belts in the area near the units 488. As further shown in FIG. 52B, the belts may include very small comb-like fingers 490 that become spread apart when the belt is moved around the units 488 (as shown in FIG. 52C) when grasping an object (such as a bag) to facilitated engagement with the object.

Figure 53A:
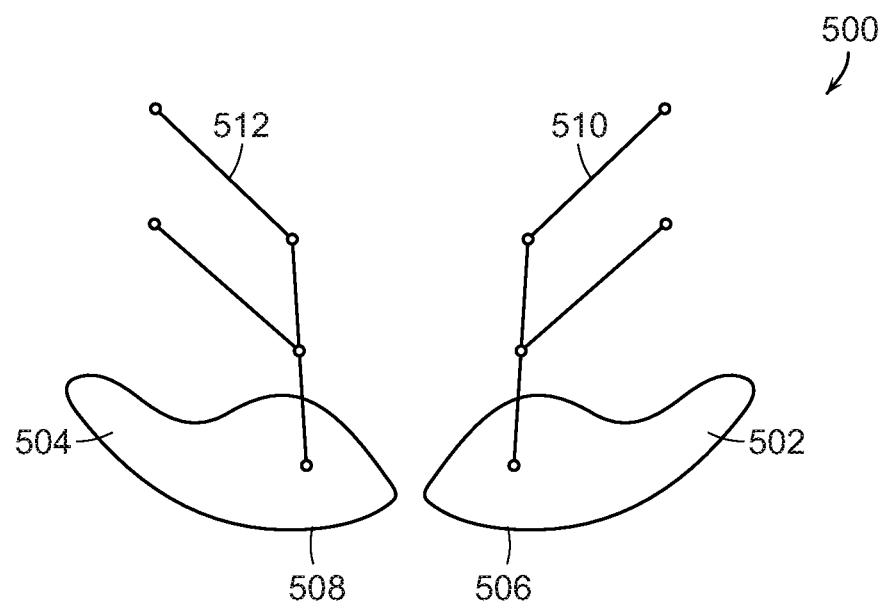
FIGS. 53A and 53B show illustrative diagrammatic views of an end effector in accordance with another embodiment of the present invention that includes a pair of grippers on linkages in the open position (FIG. 53A) and in the closed position (FIG. 53B)
Figure 53B:
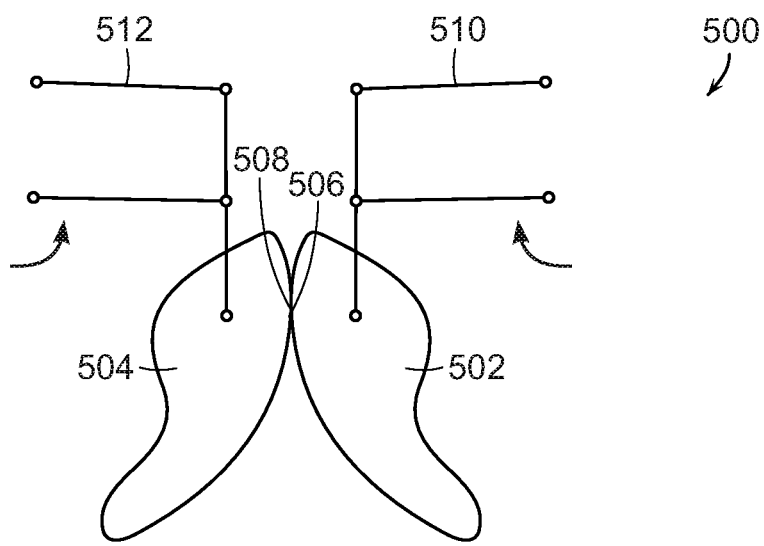

FIG. 53A shows a portion of an end effector 500 in accordance with another embodiment of the invention that includes a pair of grippers 502, 504 that provide a pair of mutually opposing surfaces 506, 508. The grippers 502, 504 are attached to two set of bar linkages 510, 512 that, when actuated (as shown in FIG. 53B), cause the grippers to come together such that the surfaces 506, 508 come close to or into contact with one another. When this occurs, the grippers may be used to grasp an object. In particular, the grippers may be placed onto an object such as a bag in the position as shown in FIG. 53A. When the bar linkages 510, 512 are actuated as shown in FIG. 53B, the grippers may grasp the bag and draw up a portion of the bag between the opposing surfaces 506, 508.

Figure 54A:
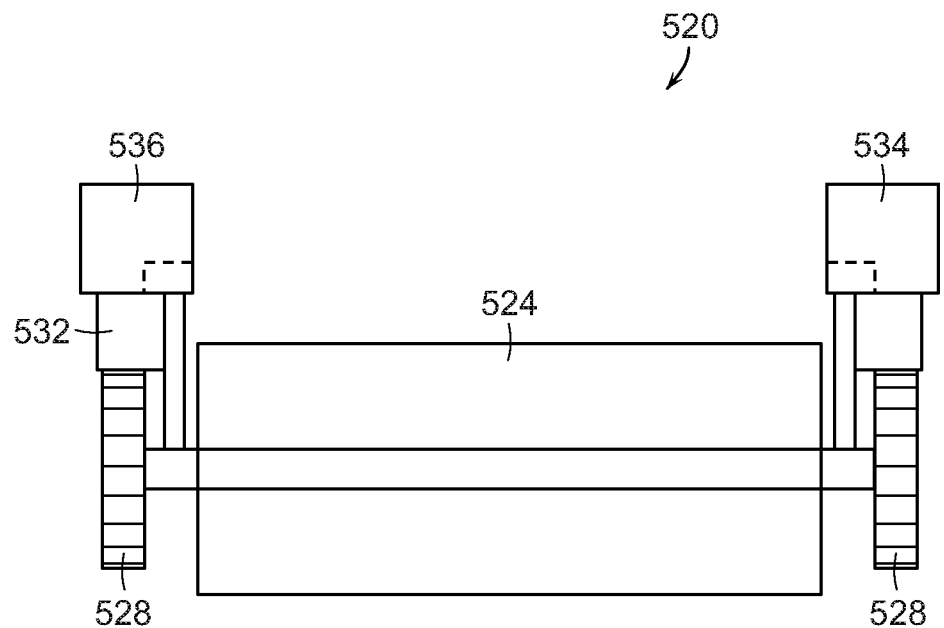
FIGS. 54A and 54B show illustrative diagrammatic views of an end effector in accordance with another embodiment of the present invention that includes a pair of racks that engage pinion gears in the open position (FIG. 54A) and in the closed position (FIG. 54B)
Figure 54B:
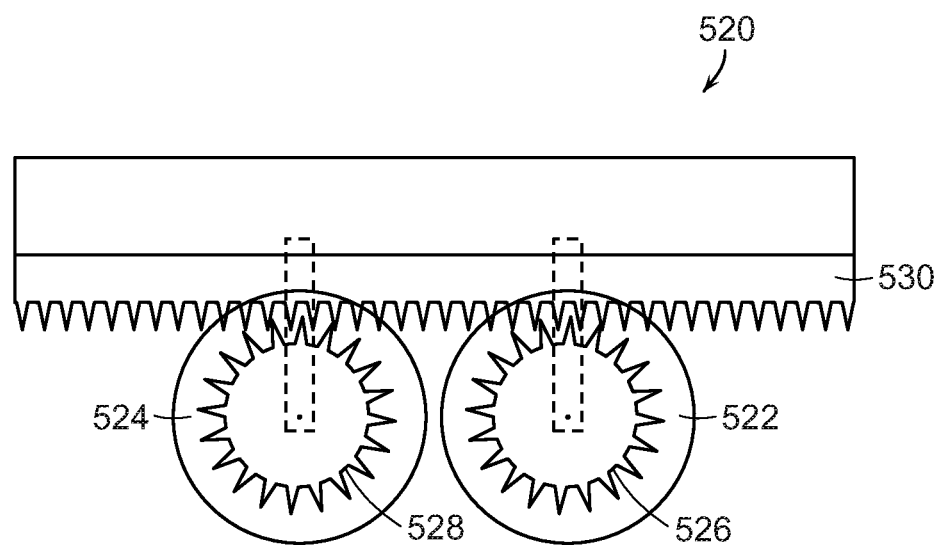

FIGS. 54A and 54B show a portion of an end effector 520 in accordance with another embodiment of the invention that includes a pair of rollers 522, 524 (again, for example made of polyurethane). The rollers each include a set of pinion gears 526, 528 that mate with a pair of racks 530, 532 (attached to support structure 534, 536 from which the rollers 522, 524 are suspended. By use of the rack and pinion gears, the rollers 522, 524 may be moved toward and away from each other, and may thereby grasp an object between the rollers 522, 524 as discussed above.

Figure 55A:
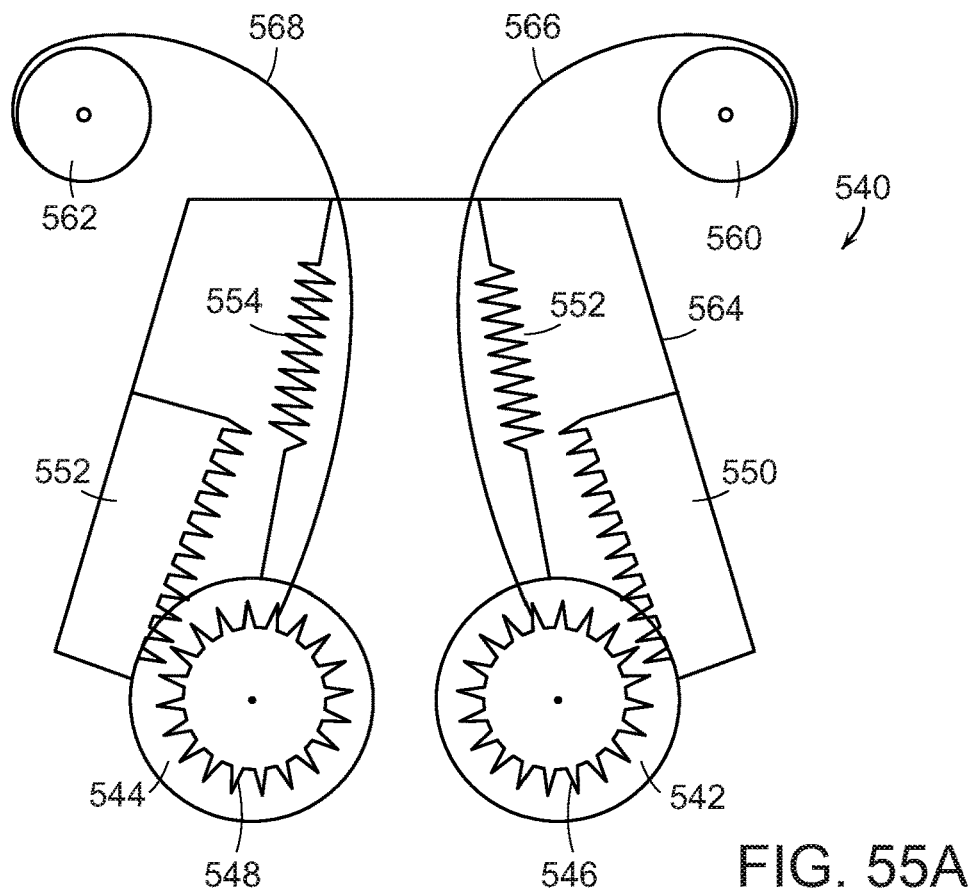
FIGS. 55A and 55B show illustrative diagrammatic views of an end effector in accordance with another embodiment of the present invention that includes pinion gears and a tensioning mechanism in the open position (FIG. 55A) and in the closed position (FIG. 55B)
Figure 55B:
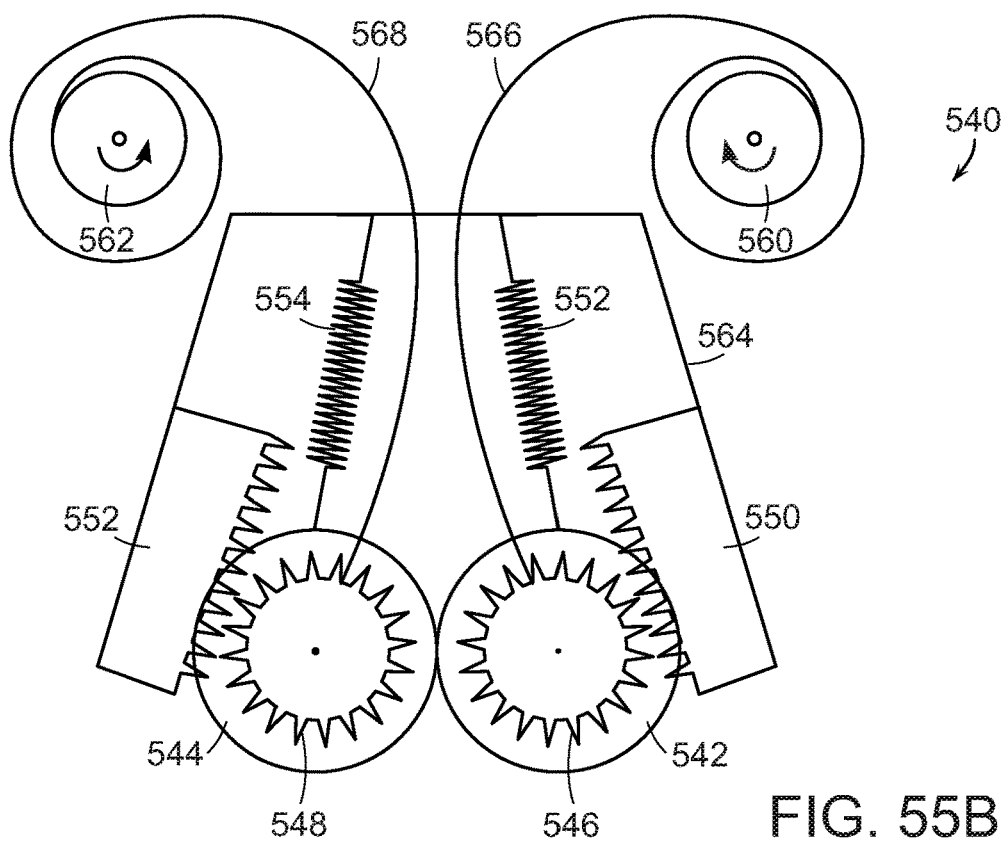

FIGS. 55A and 55B show portions of an end effector 540 that includes rollers 542, 544, each of which includes a pinion gear 546, 548 for engaging rack sections 550, 552 mounted within a frame 564. The rollers 542, 544 (again, for example made of polyurethane) are maintained in an urged upward position by spring mechanisms 552, 554. Movement of the rollers 542, 544 is controlled by actuation of rotator actuators 560, 562 that by way of tension mechanisms 556, 558 that draw the rollers 542, 544 up along the rack and pinion (546, 548, 550, 552) mechanisms as shown in FIG. 55B.

FIGS. 56A and 56B show portions of an end effector 570 similar to the end effector 540 of FIGS. 55A and 55B except that the frame 594 is flexible and includes additional spring mechanisms 600, 602 that urge the frame walls (and the rollers 572, 574 toward each other. The rollers 572, 574 each include a pinion gear 576, 578 for engaging rack sections 580, 582 mounted within the frame 594. The rollers 572, 574 (again, for example made of polyurethane) are maintained in an urged upward position by spring mechanisms 584, 586. Movement of the rollers 572, 574 is controlled by actuation of rotator actuators 590, 592 that by way of tension mechanisms 596, 598 that draw the rollers 572, 574 up along the rack and pinion (576, 578, 580, 582) mechanisms as shown in FIG. 56B.

Those skilled in the art will appreciate that numerous modification and variations may be made to the above disclosed embodiments without departing from the spirit and scope of the present invention.

What is claimed is:

1. An end effector for use with a programmable motion device, said end effector comprising a pair of rollers mounted to an end effector support structure, at least one of said pair of rollers being actuable to roll in at least one direction to draw at least a portion of an object to be grasped between mutually opposing surfaces of said pair of rollers.

2. The end effector as claimed in claim 1, wherein said at least one of said pair of rollers is actuatable to move toward another of the pair of rollers.

3. The end effector as claimed in claim 2, wherein said at least one of said pair of rollers undergoes linear movement in moving toward the other of the pair of rollers.

4. The end effector as claimed in claim 2, wherein said at least one of said pair of rollers undergoes angular movement in moving toward the other of the pair of rollers.

5. The end effector as claimed in claim 2, wherein said at least one of said pair of rollers undergoes movement via a bar linkage mechanism in moving toward the other of the pair of rollers.

6. The end effector as claimed in claim 2, wherein said at least one of said pair of rollers undergoes movement via a rack and pinion system in moving toward the other of the pair of rollers.

7. The end effector as claimed in claim 1, wherein said pair of rollers are both actuated to roll with respect to each other.

8. The end effector as claimed in claim 1, wherein at least one of said pair of rollers is actuatable to move toward and away with respect to another of said pair of rollers.

9. The end effector as claimed in claim 8, wherein both of said pair of rollers are actuatable to move toward and away from each other.

10. The end effector as claimed in claim 1, wherein each of said pair of rollers includes surface features for facilitating the grasping of objects.

11. The end effector as claimed in claim 10, wherein said surface features include protrusions on the surfaces of the pair of rollers.

12. The end effector as claimed in claim 10, wherein said surface features include cup-shaped features.

13. The end effector as claimed in claim 10, wherein said surface features include apertures through which a vacuum is provided.

14. The end effector as claimed in claim 1, wherein said pair of rollers are provided on non-linear axles.

15. The end effector as claimed in claim 1, wherein said pair of rollers are provided with non-linear surfaces.

16. The end effector as claimed in claim 1, wherein said pair of rollers are provided with mutually complementary surfaces.

17. The end effector as claimed in claim 1, wherein said end effector further includes a vacuum conduit for providing a vacuum force proximate the pair of rollers.

18. The end effector as claimed in claim 1, wherein said pair of rollers are provided with a cam surface.

19. The end effector as claimed in claim 1, wherein said pair or rollers are provided on axles that are not centrally located on the rollers.

20. An end effector for use with a programmable motion device, said end effector comprising a pair of rollers and a vacuum conduit disposed between said pair of rollers, wherein at least a portion of an object to be grasped is drawn between mutually opposing surfaces of said pair of rollers by actuating at least one of said pair of rollers to roll with respect to another of said pair of rollers and providing a vacuum through the conduit between said pair of rollers.

21. The end effector as claimed in claim 20, wherein said at least one of said pair of rollers is actuatable to move toward another of the pair of rollers.

22. The end effector as claimed in claim 21, wherein said at least one of said pair of rollers undergoes linear movement in moving toward the other of the pair of rollers.

23. The end effector as claimed in claim 21, wherein said at least one of said pair of rollers undergoes angular movement in moving toward the other of the pair of rollers.

24. The end effector as claimed in claim 21, wherein said at least one of said pair of rollers undergoes movement via a bar linkage mechanism in moving toward the other of the pair of rollers.

25. The end effector as claimed in claim 21, wherein said at least one of said pair of rollers undergoes movement via a rack and pinion system in moving toward the other of the pair of rollers.

26. The end effector as claimed in claim 20, wherein said pair of rollers are both actuated to roll with respect to each other.

27. The end effector as claimed in claim 20, wherein at least one of said pair of rollers is actuatable to move toward and away with respect to another of said pair of rollers.

28. The end effector as claimed in claim 27, wherein both of said pair of rollers are actuatable to move toward and away from each other.

29. The end effector as claimed in claim 20, wherein each of said pair of rollers includes surface features for grasping of objects.

30. The end effector as claimed in claim 29, wherein said surface features include protrusions on the surfaces of the pair of rollers.

31. The end effector as claimed in claim 29, wherein said surface features include cup-shaped features.

32. The end effector as claimed in claim 29, wherein said surface features include apertures through which a vacuum is provided.

33. The end effector as claimed in claim 20, wherein said pair of rollers are provided on non-linear axles.

34. The end effector as claimed in claim 20, wherein said pair of rollers are provided with non-linear surfaces.

35. The end effector as claimed in claim 20, wherein said pair of rollers are provided with mutually complimentary surfaces.

36. The end effector as claimed in claim 20, wherein said pair of rollers are provided with a cam surface.

37. The end effector as claimed in claim 20, wherein said pair of rollers are provided on axles that are not centrally located on the rollers.

38. A method of grasping an object using an end effector of a programmable motion device, comprising:
    engaging the object with a pair of rollers of the end effector mounted to an end effector support structure; and
    actuating at least one of said pair of rollers to roll in at least one direction to draw at least a portion of the object between mutually opposing surfaces of said pair of rollers.

39. The method as claimed in claim 38, further comprising:
    actuating said at least one of said pair of rollers to move toward another of the pair of rollers.

40. The method as claimed in claim 39, wherein said at least one of said pair of rollers undergoes linear movement in moving toward the other of the pair of rollers.

41. The method as claimed in claim 39, wherein said at least one of said pair of rollers undergoes angular movement in moving toward the other of the pair of rollers.

42. The method as claimed in claim 39, wherein said at least one of said pair of rollers undergoes movement via a bar linkage mechanism in moving toward the other of the pair of rollers.

43. The method as claimed in claim 39, wherein said at least one of said pair of rollers undergoes movement via a rack and pinion system in moving toward the other of the pair of rollers.

44. The method as claimed in claim 38, wherein said pair of rollers undergoes movement via a rack and pinion system in moving toward the other of the pair of rollers.

45. The method as claimed in claim 38, wherein said pair of rollers are both actuated to roll with respect to each other.

46. The method as claimed in claim 38, wherein at least one of said pair of rollers is actuatable to move toward and away with respect to another of said pair of rollers.

47. The method as claimed in claim 46, wherein both of said pair of rollers are actuatable to move toward and away from each other.

48. The method as claimed in claim 38, wherein each of said pair of rollers includes surface features for grasping of objects.

49. The method as claimed in claim 48, wherein said surface features include protrusions on the surfaces of the pair of rollers.

50. The method as claimed in claim 48, wherein said surface features include cup-shaped features.

51. The method as claimed in claim 48, wherein said surface features include apertures through which a vacuum is provided.

52. The method as claimed in claim 38, wherein said pair of rollers are provided on non-linear axles.

53. The method as claimed in claim 38, wherein said pair of rollers are provided with non-linear surfaces.

54. The method as claimed in claim 38, wherein said pair of rollers are provided with mutually complimentary surfaces.

55. The method as claimed in claim 38, wherein said pair of rollers are provided with a cam surface.

56. The method as claimed in claim 38, wherein said pair of rollers are provided on axles that are not centrally located on the rollers.

57. The method as claimed in claim 38, further comprising:
    providing a vacuum force proximate the pair of rollers through a vacuum conduit included in said end effector.

58. A method of grasping an object using an end effector of a programmable motion device, comprising:
    engaging the object with a pair of rollers; and
    actuating at least one of said pair of rollers to roll with respect to another of said pair of rollers and providing a vacuum through a vacuum conduit disposed between said pair of rollers to draw at least a portion of the object between mutually opposing surfaces of said pair of rollers.

59. The method as claimed in claim 58, further comprising:
    actuating said at least one of said pair of rollers to move toward another of the pair of rollers.

60. The method as claimed in claim 59, wherein said at least one of said pair of rollers undergoes linear movement in moving toward the other of the pair of rollers.

61. The method as claimed in claim 59, wherein said at least one of said pair of rollers undergoes angular movement in moving toward the other of the pair of rollers.

62. The method as claimed in claim 59, wherein said at least one of said pair of rollers undergoes movement via a bar linkage mechanism in moving toward the other of the pair of rollers.

63. The method as claimed in claim 59, wherein said at least one of said pair of rollers undergoes movement via a rack and pinion system in moving toward the other of the pair of rollers.

64. The method as claimed in claim 58, wherein said pair of rollers undergoes movement via a rack and pinion system in moving toward the other of the pair of rollers.

65. The method as claimed in claim 58, wherein said pair of rollers are both actuated to roll with respect to each other.

66. The method as claimed in claim 58, wherein at least one of said pair of rollers is actuatable to move toward and away with respect to another of said pair of rollers.

67. The method as claimed in claim 66, wherein both of said pair of rollers are actuatable to move toward and away from each other.

68. The method as claimed in claim 58, wherein each of said pair of rollers includes surface features for grasping of objects.

69. The method as claimed in claim 68, wherein said surface features include protrusions on the surfaces of the pair of rollers.

70. The method as claimed in claim 68, wherein said surface features include cup-shaped features.

71. The method as claimed in claim 68, wherein said surface features include apertures through which a vacuum is provided.

72. The method as claimed in claim 58, wherein said pair of rollers are provided on non-linear axles.

73. The method as claimed in claim 58, wherein said pair of rollers are provided with non-linear surfaces.

74. The method as claimed in claim 58, wherein said pair of rollers are provided with mutually complimentary surfaces.

75. The method as claimed in claim 58, wherein said pair of rollers are provided with a cam surface.

76. The method as claimed in claim 58, wherein said pair of rollers are provided on axles that are not centrally located on the rollers.

\* \* \* \* \*